US007703009B2

(12) United States Patent
Huang et al.

(10) Patent No.: US 7,703,009 B2
(45) Date of Patent: Apr. 20, 2010

(54) EXTENSIBLE STYLESHEET DESIGNS USING META-TAG INFORMATION

(76) Inventors: Evan S. Huang, 7634 Orange Blossom Dr., Cupertino, CA (US) 95014; Hong J. Kim, 3560 Flora Vista Ave., #313, Santa Clara, CA (US) 95051

(*) Notice: Subject to any disclaimer, the term of this patent is extended or adjusted under 35 U.S.C. 154(b) by 1312 days.

(21) Appl. No.: 10/119,281

(22) Filed: Apr. 8, 2002

(65) Prior Publication Data

US 2002/0147748 A1 Oct. 10, 2002

Related U.S. Application Data

(60) Provisional application No. 60/282,609, filed on Apr. 9, 2001, provisional application No. 60/306,095, filed on Jul. 17, 2001, provisional application No. 60/314,592, filed on Aug. 23, 2001, provisional application No. 60/349,957, filed on Jan. 17, 2002.

(51) Int. Cl.
  *G06F 15/00* (2006.01)
  *G06F 17/00* (2006.01)
(52) U.S. Cl. .............. 715/235; 715/205; 715/234; 715/243; 715/239; 715/769; 707/3; 707/102
(58) Field of Classification Search ............. 715/517, 715/513, 200, 203–204, 234–236, 238–239, 715/205, 207, 209, 210, 226, 231, 233, 243, 715/249, 253, 255, 256, 273, 700, 730, 731, 715/739, 744, 746, 760, 762, 853, 854, 861, 715/866, 968; 707/3, 5, 101, 200, 1–4, 10, 707/100, 102, 103 R, 203, E17.006, E17.007, 707/E17.008, E17.119
See application file for complete search history.

(56) References Cited

U.S. PATENT DOCUMENTS 6,085,196 A * 7/2000 Motoyama et al. .......... 707/102
6,507,857 B1 * 1/2003 Yalcinalp ................... 715/513
6,589,291 B1 * 7/2003 Boag et al. ................. 715/235
6,598,219 B1 * 7/2003 Lau ........................... 717/108
6,732,109 B2 * 5/2004 Lindberg et al. ............ 707/101
6,799,299 B1 * 9/2004 Li et al. ...................... 715/513
6,822,663 B2 * 11/2004 Wang et al. ................. 715/854
6,874,141 B1 * 3/2005 Swamy et al. .............. 717/144
7,194,683 B2 * 3/2007 Hind et al. .................. 715/522
7,308,646 B1 * 12/2007 Cohen et al. ............... 715/234

(Continued)

FOREIGN PATENT DOCUMENTS

| GB | 2 373 085 A | 9/2002 |
| WO | WO 00 54174 A | 9/2000 |
| WO | WO 01 18656 A | 3/2001 |
| WO | WO 01 18657 A | 3/2001 |

OTHER PUBLICATIONS

H. Su et al., "Automating Transformation of XML Document", WIDM 2001 Powerpoint Presentation, Nov. 2001, pp. 1-29.*

(Continued)

*Primary Examiner*—Laurie Ries
*Assistant Examiner*—Maikhanh Nguyen
(74) *Attorney, Agent, or Firm*—Perkins Coie LLP

(57) ABSTRACT

Methods and apparatuses for extensible stylesheet design using meta-tag information are disclosed. A designed stylesheet is for transferring content-oriented markup language files into a target file so as to support various presentations and information exchange. According to one aspect, a data processing mechanism starts with inserting meta-tag declarations in a target file wherein the meta-tag information pertains to information between dynamic objects in the target file and a source file. The target file with meta-tag information is then converted into one or more extensible stylesheets.

29 Claims, 22 Drawing Sheets

U.S. PATENT DOCUMENTS

| | | | |
|---|---|---|---|
| 2001/0037346 A1* | 11/2001 | Johnson | 707/513 |
| 2002/0026461 A1* | 2/2002 | Kutay et al. | 707/523 |
| 2002/0049702 A1* | 4/2002 | Aizikowitz et al. | 707/1 |
| 2002/0049790 A1* | 4/2002 | Ricker et al. | 707/513 |
| 2002/0073119 A1* | 6/2002 | Richard | 707/513 |
| 2002/0085032 A1* | 7/2002 | Fong et al. | 345/760 |
| 2002/0123878 A1* | 9/2002 | Menke | 704/2 |
| 2002/0123993 A1* | 9/2002 | Chau et al. | 707/5 |
| 2002/0143727 A1* | 10/2002 | Hu et al. | 707/1 |
| 2002/0143816 A1* | 10/2002 | Geiger et al. | 707/513 |
| 2002/0143821 A1* | 10/2002 | Jakubowski | 707/522 |
| 2002/0152244 A1* | 10/2002 | Dean et al. | 707/530 |
| 2003/0014397 A1* | 1/2003 | Chau et al. | 707/3 |
| 2003/0037076 A1* | 2/2003 | Bravery et al. | 707/517 |
| 2003/0074181 A1* | 4/2003 | Gharavy | 704/1 |
| 2003/0149934 A1* | 8/2003 | Worden | 715/513 |
| 2004/0024812 A1* | 2/2004 | Park et al. | 709/203 |
| 2005/0066270 A1* | 3/2005 | Ali et al. | 715/513 |

OTHER PUBLICATIONS

B. De Boer, "Tutorial: don't be afraid of XSLT", eurotex 2001, Sep. 2001, pp. 1-17.*

C. Qiang, "IBM WebSphere Software Platform for e-Business: XML Review", IBM Solution Enable Center Presentation, May 2001.*

K. Ono et al., "SXLT Stylesheet Generation by Example with WYSIWYG Editing", Proceedings of the 2002 Symposium on Applications and the Internet, Feb. 2002, pp. 150-159.*

H. Lie et al., "Multipurpose Web Publishing Using HTML, XML and CSS", Communications of the ACM, Oct. 1999, vol. 42, No. 10, pp. 95-101.*

"XSL Stylesheet Editor Technology Preview," 2000, pp. 1-7.*

Anonymous: "Parameterized XSL Style Sheets", Research Disclosure, Kenneth Mason Publications, Hampshire, GB, vol. 42, No. 423, Jul. 1, 1999, page complete XP002212821, ISSN: 0374-4353.

Adler et al: "Extensible stylesheet language (XSL): W3C working draft", XP002196262.

W3C: "XSL Transformations (XSLT)", XP002189938.

"Introduction of XSLT Designer", <http://web.archive.org/web/20010503073625/http://www.tagfree.com/english/product/help_en/xsIt_intro.htm>, May 3, 2001.

* cited by examiner

```
<!-- ........ Document Type Definitions (DTD) ........ -->
<!-- document element -->
<!ELEMENT document  (recipe+) >

<!-- ........ recipe element ........ -->
<!ELEMENT recipe (ingredient+, procedure+, presentation, originate) >
<!ATTLIST recipe title CDATA #REQUIRED>

<!-- ........ ingredient element ........ -->
<!ELEMENT ingredient (#PCDATA) >
<!ATTLIST ingredient amount CDATA #REQUIRED>

<!-- ........ procedure element ........ --> <!ELEMENT procedure (#PCDATA) >
<!ATTLIST procedure step CDATA #IMPLIED>

<!-- ........ presentation element ........ -->
<!ELEMENT presentation (#PCDATA) >

<!-- ........ originate element ........ -->
<!ELEMENT originate EMPTY>
<!ATTLIST originate name CDATA #REQUIRED>
<!ATTLIST originate website CDATA #IMPLIED>
<!ATTLIST originate date CDATA #REQUIRED>

<!-- ........ END of DTD ........ -->
```

*Fig. 2A*

```
<?xml version="1.0"?>
<?xml-stylesheet type="text/xsl" href="untitled1.xsl"?>
<document>
  <recipe>
    <title>Green Chili Salsa</title>
    <ingredient>Chopped Tomatoes<amount>1 16-ounce Can</amount></ingredient>
    <ingredient>Chopped Green Chile<amount>3 Tablespoons</amount></ingredient>
    <ingredient>Diced Onions<amount>3 Tablespoons</amount></ingredient>
    <ingredient>Chopped Garlic<amount>1 Tablespoon</amount></ingredient>
    <ingredient>Salt<amount>¼ Teaspoon</amount></ingredient>
    <ingredient>Lime Juice<amount>½ Lime</amount></ingredient>
    <ingredient>Chopped Cilantro<amount>1 Tablespoon</amount></ingredient>
    <procedure>In a medium bowl, mix together all ingredients.</procedure>
    <presentation>Use as a dip, or over grilled vegetables,
or toss with bowtie noodles for an appetizer course.</presentation>
    <originate name = "VeggieLife"><website>www.VeggieLife.com</website>
    <date>November 1997</date></originate>
  </recipe>
</document>
```

```
<?xml version="1.0"?>
<xsl:stylesheet version="1.0" xmlns:xsl="http://www.w3.org/1999/XSL/Transform">
<xsl:template match="/"><xsl:apply-templates/></xsl:template>

<xsl:template match="document"><html><body><xsl:apply-templates/></body></html></xsl:template>

<xsl:template match="recipe"><h1><center><font color="teal">Title: </font><font color="red">
<xsl:value-of select="title"/>
</font></center></h1><h2><center><font color="teal">From: </font>
<font color="gray"><xsl:for-each select="originate" ><xsl:value-of select="@name" /></xsl:for-each>
</font></center></h2><p><center><table bgcolor="ffffc0"><tr><td><font color="teal" size="5">
Ingredient:</font></td></tr><tr><xsl:for-each select="ingredient">
<tr><td><xsl:value-of select="text()" /></td>
<td><font color="blue"><xsl:value-of select="amount"/></font></td></tr>
</xsl:for-each></table></center></p><p><center><table><tr><td><font color="teal" size="5">
Procedure:</font></td></tr><xsl:for-each select="procedure"><tr><td><xsl:value-of select="text()" />
</td></tr></xsl:for-each><tr><xsl:for-each select="presentation"><tr><td><xsl:value-of select="text()" /></td></tr>
</xsl:for-each></table></center></p><p><center><table bgcolor="c0fff" width="80%">
<xsl:for-each select="originate"><tr><td align="left"><xsl:value-of select="website" /></td>
<td align="right"><xsl:value-of select="date" /></td></tr></xsl:for-each></table></center></p>
</xsl:template>

</xsl:stylesheet>
```

302 — <xsl:template match="document"><html><body><xsl:apply-templates/></body></html></xsl:template>

304 — <xsl:value-of select="title"/>

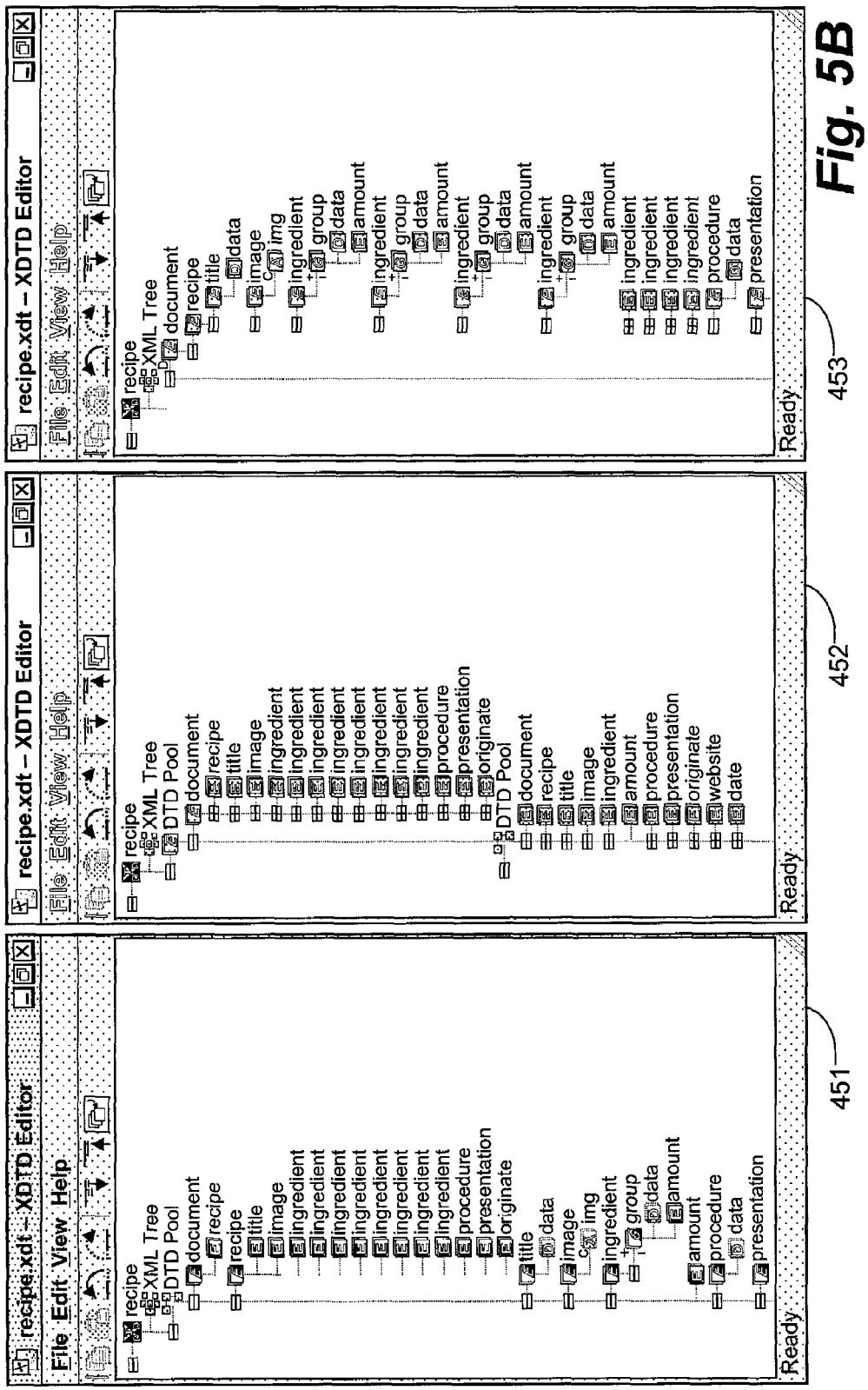

Fig. 5C

```
recipe.xml - Notepad
File Edit View Help

<?xml version=' encoding=' ISO-8859-1' ?>
<document><recipe><title>CORN WITH LEMON, ORANGE, AND THYME</title><image
img="image\recipe.jpg"/><ingredient>2 teaspoons peanut
oil<amount/></ingredient><ingredient>1 small onion, finely
chopped<amount/></ingredient><ingredient>1 tablespoon finely grated lemon
zest<amount/></ingredient><ingredient>1 tablespoon finely grated orange
zest<amount/></ingredient><ingredient>1 teaspoon chopped fresh thyme (or ½
teaspoon dried)<amount/></ingredient><ingredient>4 cups sweet
corn<amount/></ingredient><ingredient>2 tablespoons
water<amount/></ingredient><ingredient>Salt and pepper to
taste<amount/></ingredient><procedure>Arrange one eighth of the topping on
each crust, and scatter a little shredded cheese over topping. Cover grill
and cook for 3 to 4 minutes, rotation pizzas to prevent burning, until
cheese is melted and underside of crust is golden
brown.</procedure><presentation>The fresh citrus flavor of lemon and orange,
and the savory flavor of thyme pair wonder- fully with the sweetness of
corn.</presentation><originate
name="VeggieLife"><website>www.VeggieLife.com</website><data>March
1998</data></originate></recipe></document>
```

```
<html>

<head>
<meta http-equiv="Content-Type" content="text/html; charset=windows-1252">
<meta name="GENERATOR" content="Microsoft FrontPage 4.0">
<meta name="ProgId" content="FrontPage.Editor.Document">
<title>Title</title>
</head>

<body>

<h1 align="center"><center><font color="teal">Title: </font></center><font color="red">{xc_xslt
value-of document/recipe/title}</font></h1>
<h2><center><font color="teal">From: </font><font color="gray">{xc_xsl value-of
document/recipe/originate/@name}</font></center></h2>
<center>
<table bgColor="#ffffc0" width="756">
  <tbody>
    <tr>
      <td width="383"><font color="teal" size="5">Ingredient: {xc_xsl for-each
        document/recipe/ingredient}</font></td>
    </tr>
    <tr>
      <td width="383">{xc_xsl value-of document/recipe/ingredient}</td>
      <td width="359"><font color="blue">{xc_xsl_value-of
        document/recipe/ingredient/amont}</font></td>
    </tr>
  </tbody>
</table>
</center>
<p><center>
<table>
  <tbody>
    <tr>
      <td><font color="teal" size="5">Procedure:</font></td>
    </tr>
    <tr>
      <td>{xc_xsl value-of doucment/recipe/procedure}</td>
    </tr>
    <tr>
      <td></td>
    </tr>
    <tr>
      <td><font color="teal" size="5">Presentation:</font></td>
    </tr>
    <tr>
      <td>{xc_xsl value-of document/recipe/presentation}</td>
    </tr>
  </tbody>
</table>
</center>
<p><center>
<table width="663" bgColor="#c0ffff">
  <tbody>
    <tr>
      <td align="left" width="327">{xc_xsl value-of document/recipe/originate/
        website}</td>
      <td align="right" width="322">{xc_xsl value-of document/recipe/originate/
        date}</td>
    </tr>
  </tbody>
</table>
</center>

</body>

</html>
```

*Fig. 6A*

```
<html>

<head>
<meta http-equiv="Content-Type" content="text/html; charset=windows-1252">
<meta name="GENERATOR" content="Microsoft FrontPage 4.0">
<meta name="ProgId" content="FrontPage.Editor.Document">
<title>Title</title>
</head>

<body>

<h1 align="center"><center><font color="teal">Title: </font></center><font color="red"><i>Green
Chili Salsa</i></font></h1>
<h2><center><font color="teal">From: </font><font color="gray"><i>VeggieLife</i></font></center></h2>
<center>
<table bgColor="#ffffc0" width="756">
  <tbody>
    <tr>
      <td width="383"><font color="teal" size="5">Ingredient: {xc_xsl for-each}</font></td>
    </tr>
    <tr>
      <td width="383"><i>Chopped Tomatoes</i></td>
      <td width="359"><font color="blue"><i>1 16-ounce can</i></font></td>
    </tr>
  </tbody>
</table>
</center>
<p><center>
<table>
  <tbody>
    <tr>
      <td><font color="teal" size="5">Procedure:</font></td>
    </tr>
    <tr>
      <td><i>In a medium bowl, mix together all ingredients.</i></td>
    </tr>
    <tr>
      <td></td>
    </tr>
    <tr>
      <td><font color="teal" size="5">Presentation:</font></td>
    </tr>
    <tr>
      <td><i>Use as a dip, or over grilled vegetables, or toss with bowtie noodles for an appetizer
        course</i>.</td>
    </tr>
  </tbody>
</table>
</center>
<p><center>
<table width="663" bgColor="#c0ffff">
  <tbody>
    <tr>
      <td align="left" width="327"><i>www.VeggieLife.com</i></td>
      <td align="right" width="322"><i>November 1997</i></td>
    </tr>
  </tbody>
</table>
</center>

</body>

</html>
```

*Fig. 6B*

| Green Chili Salsa | {xc_xslt value-of document/recipe/title} |
| --- | --- |
| VeggieLife | {xc_xsl value-of document/recipe/originate/@name} |
| Chopped Tomatoes | {xc_xsl value-of document/recipe/ingredient} |
| 1 16-ounce can | {xc_xsl value-of document/recipe/ingredient/amont} |
| In a medium bowl, mix together all ingredients. | {xc_xsl value-of doucment/recipe/procedure} |
| Use as a dip, or over grilled vegetables, or toss with bowtie noodles for an appetizer course. | {xc_xsl value-of document/recipe/presentation} |
| www.VeggieLife.com | {xc_xsl value-of document/recipe/originate/ website} |
| November 1997 | {xc_xsl value-of document/recipe/originate/ date} |

*Fig. 6C*

```
<?xml version="1.0" encoding="iso-8859-1"?>
<root>
    <book>
        <name>C++ Programming</name>
        <author> Michael Kim</author>
    </book>
    <book>
        <name>Visual C++ 5</name>
        <author>Ivor Horton</author>
    </book>
</root>
```

```
<HTML>
<head>
    <title>C++ Programming</title>
</head>
<body>
    <p>C++ Programming, Visual C++ 5</p>
</body>
</HTML>
```

EXTENSIBLE STYLESHEET DESIGNS USING META-TAG INFORMATION

CROSS-REFERENCE TO RELATED APPLICATION

This application claims the benefits of the following U.S. provisional applications:

U.S. Provisional Application No. 60/282,609, filed Apr. 9, 2001, and entitled "Method and Apparatus for Extensible Stylesheet Design Using Meta-Tag Information";

U.S. Provisional Application No. 60/306,095, filed Jul. 17, 2001, entitled "Method and Apparatus for Extensible Stylesheet Design Using Meta-Tag Information and/or Associated Meta-Tag Information";

U.S. Provisional Application No. 60/314,592, filed Aug. 23, 2001, entitled "Method and Apparatus for Extensible Markup Language Conversion and Extensible Stylesheet Design Using Meta-Tag Information and/or Associated Meta-Tag"; and U.S. Provisional Application No. 60/349,957, filed Jan. 17, 2002, entitled "Extensible Markup Language Conversion and Stylesheet Design Using Meta-Tag Information and/or Associated Meta-Tag Information"; all of which are hereby incorporated by reference for all purposes. This application is also related to co-pending U.S. patent application Ser. No. 09/754,969, entitled "Method and apparatus for utilizing document type definition to generate structured documents," which is hereby incorporated by reference.

BACKGROUND OF THE INVENTION

1. Field of the Invention

The present invention generally relates to the area of document processing and electronic publishing system, and more particularly, relates to techniques for designing extensible stylesheets.

2. Description of the Related Art

The Internet is a rapidly growing communication network of interconnected computers around the world. Together, these millions of connected computers form a vast repository of hyperlinked information that is readily accessible by any of the connected computers from anywhere and anytime. With millions of web pages being created and added to this vast repository each day or year, there is a tremendous need to quickly and easily convert documents, such as presentations, data sheets or brochures, into a format presentable to and accessible by other applications or devices on the Internet.

It is well known that a preferable format that is presentable to a web browsing application (e.g. a browser) is in a markup language, such as Hypertext Markup Language (HTML), Extensible Markup Language (XML), Standard Generalized Markup Language (SGML) or Wireless Markup Language (WML). Files or documents that are so composed, edited or managed for web browsing applications are commonly referred to as structured files or documents. Among the structured documents, a content-oriented structured document like XML or SGML is capable of supporting any markup tags from document type definitions (DTD) or schema while a presentation document in HTML or WML can only support a fixed set of markup tags.

The demand for dynamically converting the content-oriented structured documents with proper style transformation for a particular request medium opens a new paradigm for information exchange and storage. For example, contents in a website are stored in XML formats. If a web browser (e.g., Netscape or IE) in a desktop computer requests information form the website, the website is preferably to convert the contents in XML into converted contents in HTML and subsequently sends the converted files back to the browser. If a portable device (e.g. a PDA or internet-enabled cell phone) requests information by a microbrowser from the same website, the website is preferably to convert the contents in XML into converted contents in WML and send the converted files back to the microbrowser. Furthermore, the website can also convert the internal XML into another type of XML so as to exchange information between websites.

One need in the aforementioned example for various publications and information exchange is a proper transformation from XML into various formats.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention pertain to the use of meta-tag information to design extensible stylesheets (XSL) for transferring a source XML file into a target file. This source file is sometimes referred to as a "source document" or a "distinguished source document." The target file is sometimes referred to as a "target document" or a "distinguished target document." According to one aspect of the present invention, when a target file is displayed (e.g., in a browser or authoring tool), the output presentation includes a number of objects, such as a picture or a sentence or a group of words. Some of the objects are dynamic in a sense that these objects are respectively linked with source elements or objects in the source file so that any changes to the source objects will be dynamically reflected in the target file. Each of the meta-tags inserted specifies a relationship to the corresponding source object in the source file. As one of the features in the present invention, unique ways to place the meta-tags are provided depending on implementation and application.

Once the meta-tags are created in the target file, a converting module automatically generates a resultant XSL file in reference to the target file. The converting module is configured to search for the meta-tags and subsequently generates the XSL for the target file.

The present invention may be implemented as a method, a system, a software product or other forms. According to one implementation, the present invention is a method. The method receives a definition file including document type definitions (DTD) for the source XML and exports meta-tag information from the definition file through clipboard, drag-and-drop mechanisms, or OLE data transfer mechanisms to an authoring tool for the target file. The target file embedded with the source meta-tag information is further converted into an XSL file. In one implementation, the meta-tag information is exported from a schema file or a source XML file. In another implementation, the meta-tag information is created by directly typing in the authoring tool of the target file. Nevertheless, the XSL file is created from a target file containing at least one meta-tag indicating an association relationship to the source file.

Objects, benefits and advantage together with the foregoing are attained in the exercise of the invention in the following description and resulting in the embodiments illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2A is an example of document type definitions (DTD) for recipe-type documents;

FIG. 2B shows an extensible markup language (XML) file based on the document type definitions (DTD) in FIG. 2A;

FIG. 3A shows an extensible stylesheet language (XSL) file, which transfers the XML file in FIG. 2B into an HTML file;

FIG. 5B shows an example of creating a DTD of an XML file for an HTML file using the XDTD Editor and includes of an expanded view of the created DTD, an example of creating XML elements based on the created DTD and an expanded view of an XML Tree with data nodes for elements, and attribute nodes for elements;

FIG. 5C shows a corresponding XML file;

FIG. 6A shows an example of a target HTML file with inserted meta-tag information in FrontPage, in particular, this HTML file is a combination of the static texts, such as "Title:", "From:", "Ingredient:" . . . , and the dynamic information or objects from the source XML file;

FIG. 6B shows an example of a target HTML file with inserted meta-tag and associated meta-tag information in FrontPage;

FIG. 6C shows a meta-tag association file containing dynamic objects, respectively, represented by the meta-tags, each starting with {xc_xsl for-each}, to specify the associated XSL actions and/or the source XML tags;

FIG. 8A shows a file in XML with <root/> as the root element;

FIG. 8B shows a corresponding HTML document in reference to the file of FIG. 8A;

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, logic blocks, processing, and other symbolic representations that directly or indirectly resemble the operations of data processing devices coupled to networks. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1A:
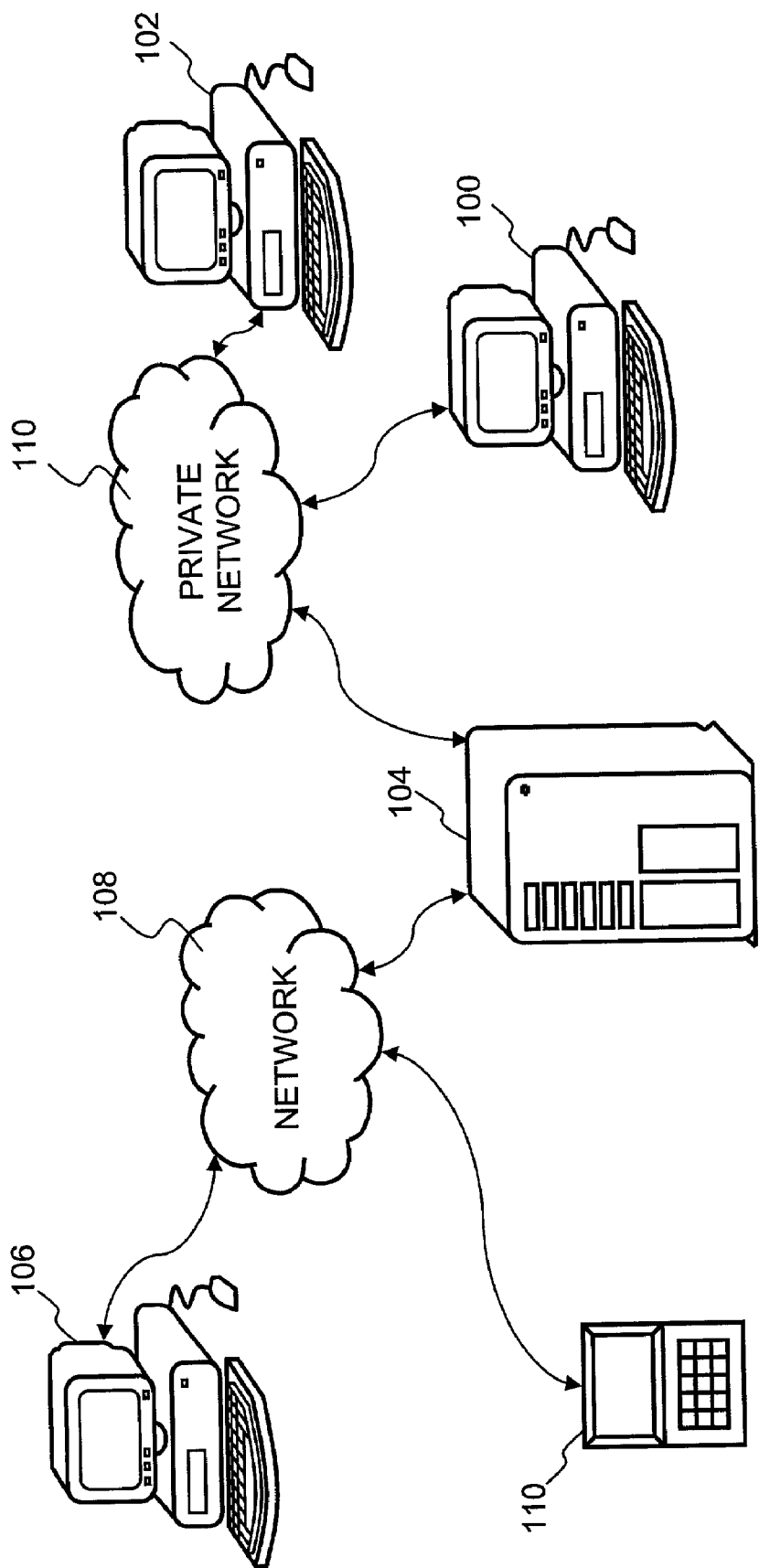
FIG. 1A shows a basic system configuration in which the present invention may be implemented in accordance with a preferred embodiment.

Referring now to the drawings, in which like numerals refer to like parts throughout the several views. FIG. 1A shows a basic system configuration in which the present invention may be implemented in accordance with a preferred embodiment. Content-oriented documents containing information, such as product descriptions, functions lists and price schedules, may be created using an authoring tool executed on a computer 100. Preferably, these documents may be in XML (Extensible Markup Language). XML (Extensible Markup Language) is a flexible way to create common information formats and share both the format and the data on the World Wide Web, intranets, and elsewhere. XML is "extensible" because, unlike HTML, the markup symbols are unlimited and self-defining. XML is actually a simpler and easier-to-use subset of the Standard Generalized Markup Language, the standard for how to create a document structure.

The extensible stylesheets (or XSL) to transfer these documents into various presentations may be created in a computing device 102, which may be a server station or a desktop computer loaded with an executable version of one embodiment implementing the present invention.

In one setting, computer 100 and computing device 102 are inseparable and perform document conversion process that ultimately represents contents in a format of markup language such as WML or HTML. In one application, the content-oriented documents represented in XML and transformations in XSL become available through a private network 110 to a service server 104 that hosts what is generally referred to as a www (world wide web) site.

In one situation, a user uses a desk computer 106 that operates a browsing application and is coupled to data network 108 to access files on service server 104. These requested XML files will be converted into HTML files by proper XSL files and be sent back to the desktop computer. In another situation, a user uses a PDA 110 that operates a WAP browsing application and is coupled to data network 108 (perhaps via a wireless network) to access files on service server 104. These requested XML files will be converted into WML files by the proper XSL files and be sent back to the PDA.

As will be explained below, the present invention is not limited to the Internet applications. It may be practiced in individual computers in which users often create the XSL files to convert the XML files into the HTML or WML files off-line. Since the contents and presentations are separated, users can easily create another set of XSL files for different look and feel.

Figure 1B:
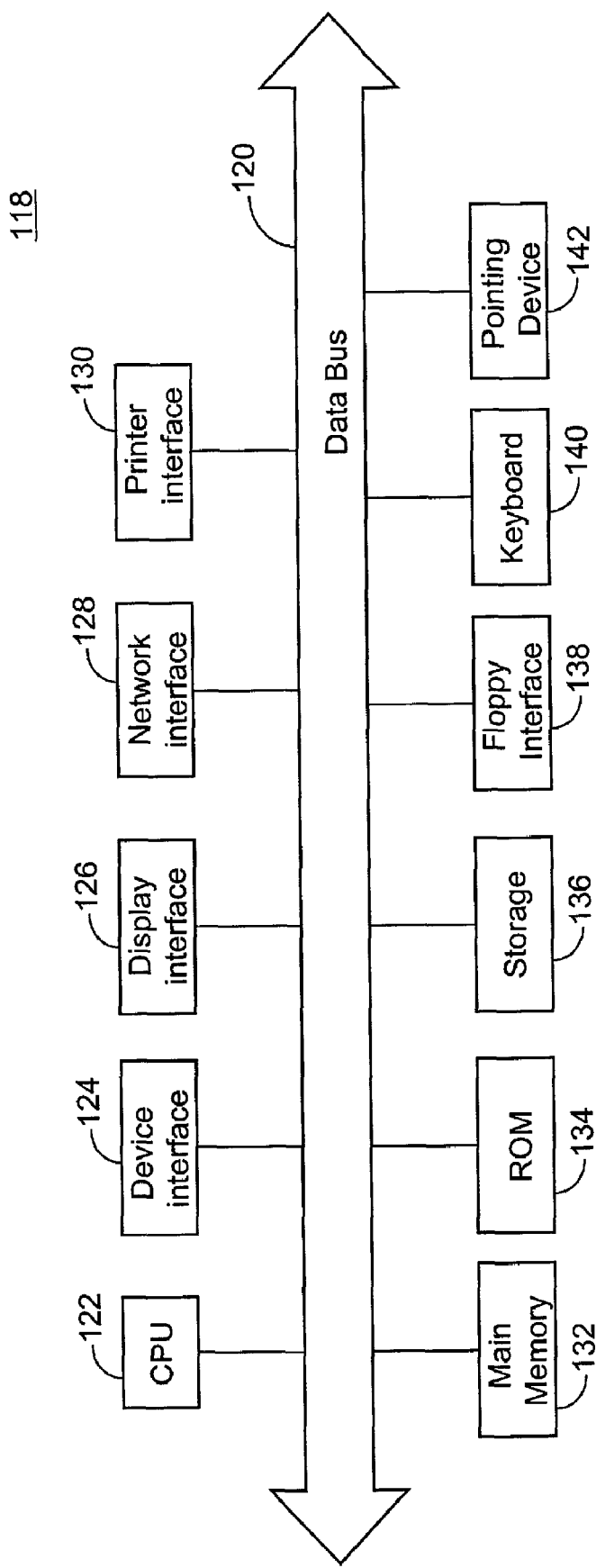
FIG. 1B illustrates internal construction blocks of a system in which the present invention may be implemented and executed to achieve desired results contemplated in the present invention.

FIG. 1B shows internal construction blocks of a system 118 in which the present invention may be implemented and executed. System 118 may correspond to a client device (e.g. computer 100, 102 or 106) or a server device (e.g. server 104). As shown in FIG. 1B, system 108 includes a central processing unit (CPU) 122 interfaced to a data bus 120 and a device interface 124. CPU 122 executes certain instructions to manage all devices and interfaces coupled to data bus 120 for synchronized operations and device interface 124 may be coupled to an external device such as computer 102 hence documents therefrom are received into memory or storage through data bus 120. Also interfaced to data bus 120 is a display interface 126, a network interface 128, a printer interface 130 and a floppy disk drive interface 138 for accessing the contents of a floppy disk. Generally, an executable version of one embodiment of the present invention is loaded into memory (e.g. 132, 134 or 136) through floppy disk drive interface 138, network interface 128, device interface 124 or other interfaces coupled to data bus 120.

Main memory 132 such as random access memory (RAM) is also interfaced to data bus 120 to provide CPU 122 with the instructions and access to memory storage 136 for data and other instructions. In particular, when executing stored application program instructions, such as the complied and linked version of the present invention, CPU 122 is caused to manipulate the data to achieve results contemplated by the present invention. ROM (read only memory) 134 is provided for storing invariant instruction sequences such as a basic input/output operation system (BIOS) for operation of keyboard 140, display 126 and pointing device 142 if there are any. The main memory, ROM, memory storage, and floppy disks—either alone or in various combinations—are sometimes referred to as "computer-readable media."

According to one embodiment, a content-oriented document such as XML starts with document type definitions (DTD) or schema to define document elements. FIG. 2A illustrates an example of DTD 200 for "recipe-type" documents, in which a document is to be broken down into structures of document elements. A particular document element 202 may contain other document elements and attributes. Another example of the document element 204 contains only the parsed character data. FIG. 2B shows an example of an XML file, where information is represented in parsed data elements defined in document type definitions (DTD) as given in FIG. 2A.

Figure 3B:
FIG. 3B shows a screenshot of the transferred HTML file of FIG. 3A.

An XML file can be transferred into various presentations using extensible stylesheets (XSL). An example of an XSL file which converts the XML file 206 into an HTML file is given in FIG. 3A. In particular, block 302 shows that the top level <html> tag is created when the XSL file matches the tag "document" and block 304 shows how to assign the value from the source XML file to the target HTML file. A corresponding screenshot of the resulted HTML from a browser application (e.g. Microsoft Internet Explorer) is given in FIG. 3B.

Figure 3C:
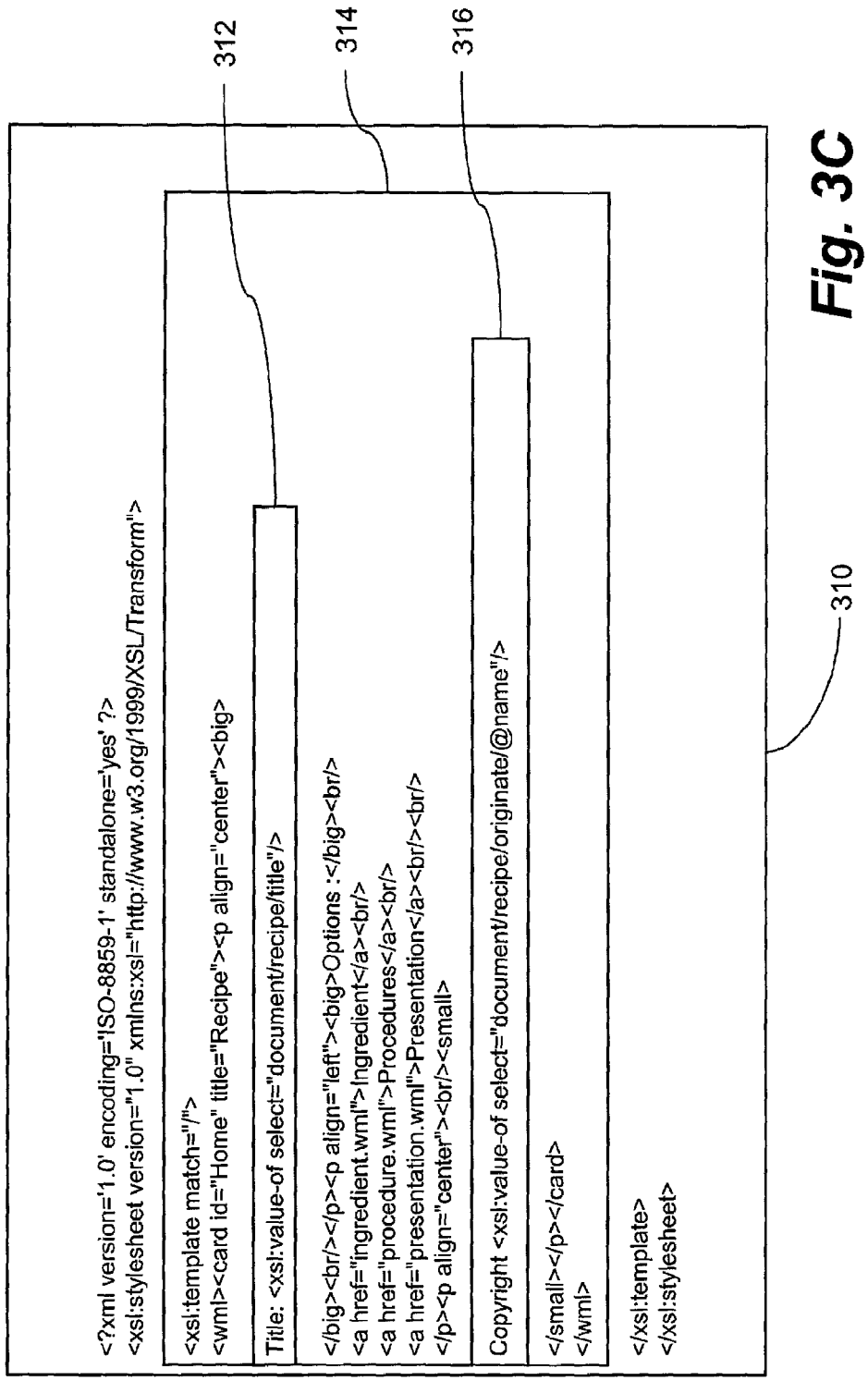
FIG. 3C shows an XSL file, which transfers the XML file in FIG. 2B into a WML file.

Another example of an XSL file which converts the XML file 206 into a WML file is given in FIG. 3C. In particular, block 314 shows that the top level <wml> tag is created when the XSL file matches the root element, block 312 shows how to assign the "title" value from the source XML file to the target WML file, and block 316 shows how to assign the "name" attribute of the "originate" element from the source XML file to the target WML file.

Figure 3D:
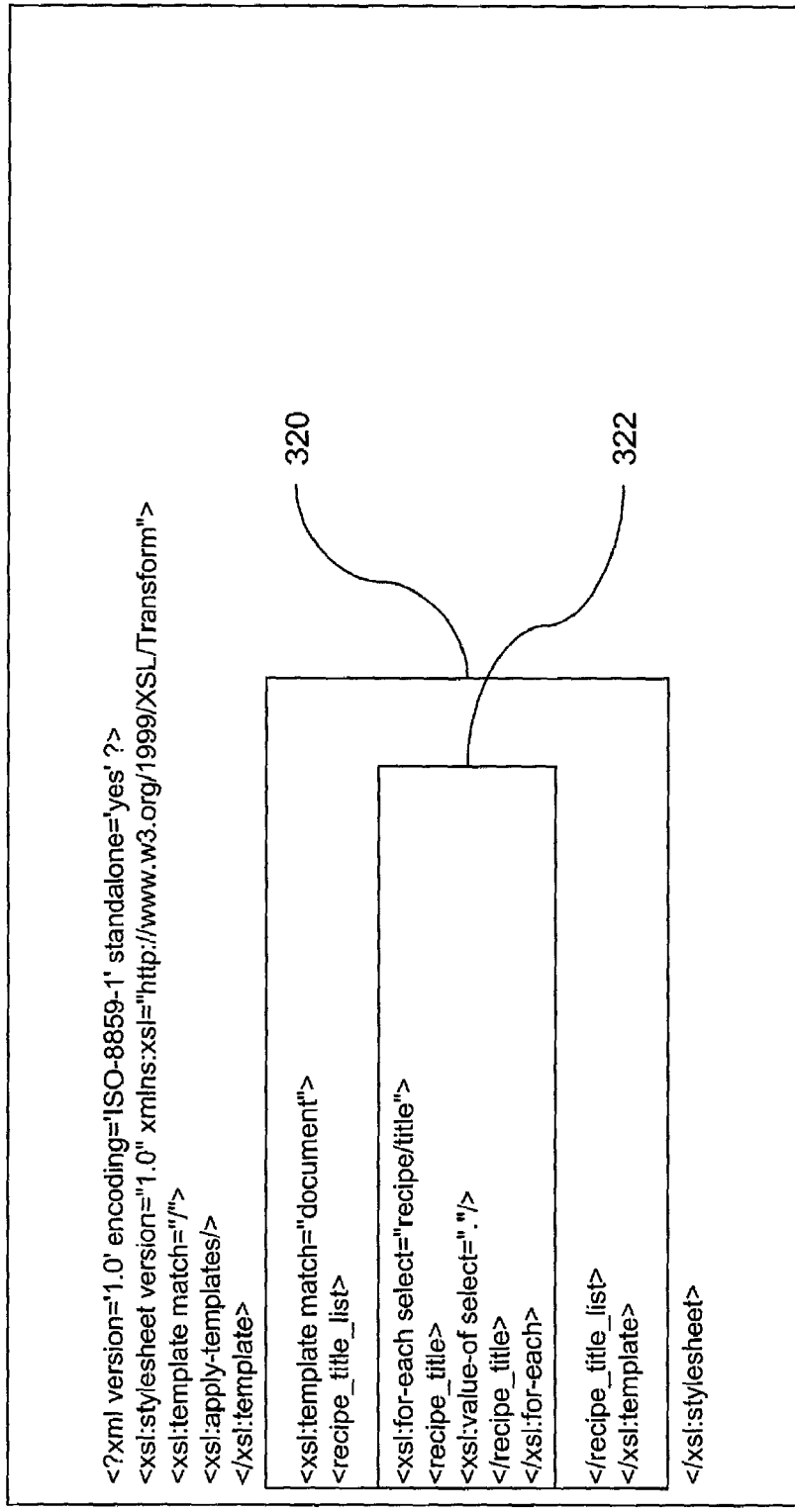
FIG. 3D shows an XSL file, which transfers the XML file in FIG. 2B into another XML file.

Other than transferring an XML file into various presentations, an XSL file can also transfer an XML file into another XML file with different DTD or schema. The primary reason for this type of transformation is for information exchange between different systems. FIG. 3D shows an example of an XSL file, which converts the XML file 206 into another XML file of a list of the recipe titles. In particular, block 320 shows that the top level <recipe_title_list> tag is created when the XSL file matches the "document" element and block 322 shows how to assign each of the "title" values in the source XML file to the <recipe_title> tag in the target XML file.

From the above XSL examples, one can see that an XSL file is a combination of a target file (e.g. in HTML, WML, or XML) and <xsl:> tags to associate the information from the source XML file and/or through the source XML's DTD or schema file. The present invention pertains to techniques for designing XSL files. According to one embodiment, an authoring tool is employed. The authoring tool may be FrontPage for HTML, Intava Gravity Professional for WML, and XMLeditor for XML. With one of these WYSIWYG authoring tools, a user can design the look-and-feel of a target file or an output presentation with an XML editor and a user can design a target XML tree showing the hierarchical relationships among the source objects (e.g. document elements), which is described in detail in co-pending U.S. patent application Ser. No. 09/754,969. Then, the user can insert meta-tag information that specifies the corresponding source information, right in the authoring tools for the target file. The target file with meta-tag information will be loaded into an XSL converting module that automatically generates the resultant XSL files in reference to the target file or presentations.

Figure 4A:
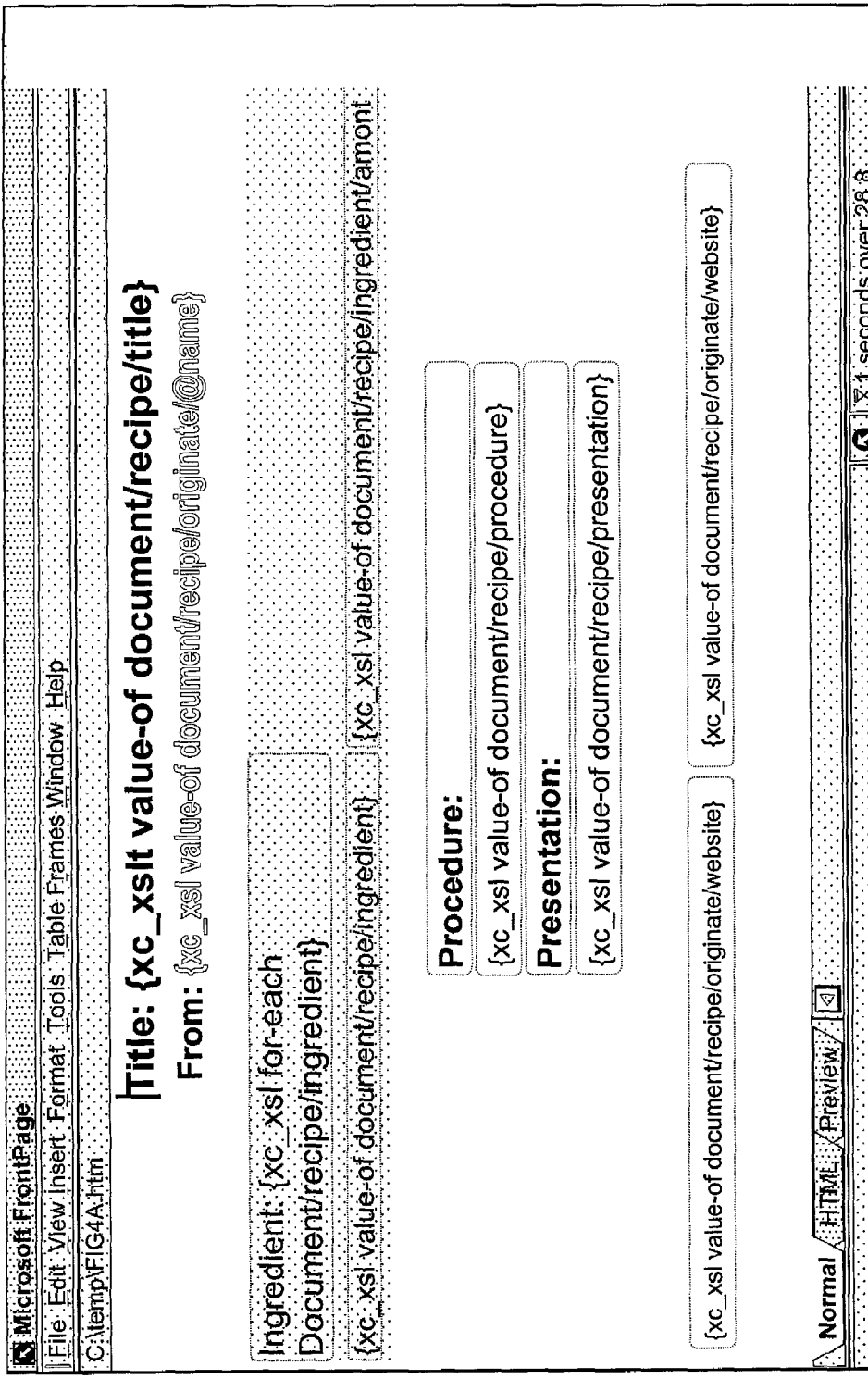
FIG. 4A shows a screenshot of a target HTML with inserted meta-tag information.
Figure 4B:
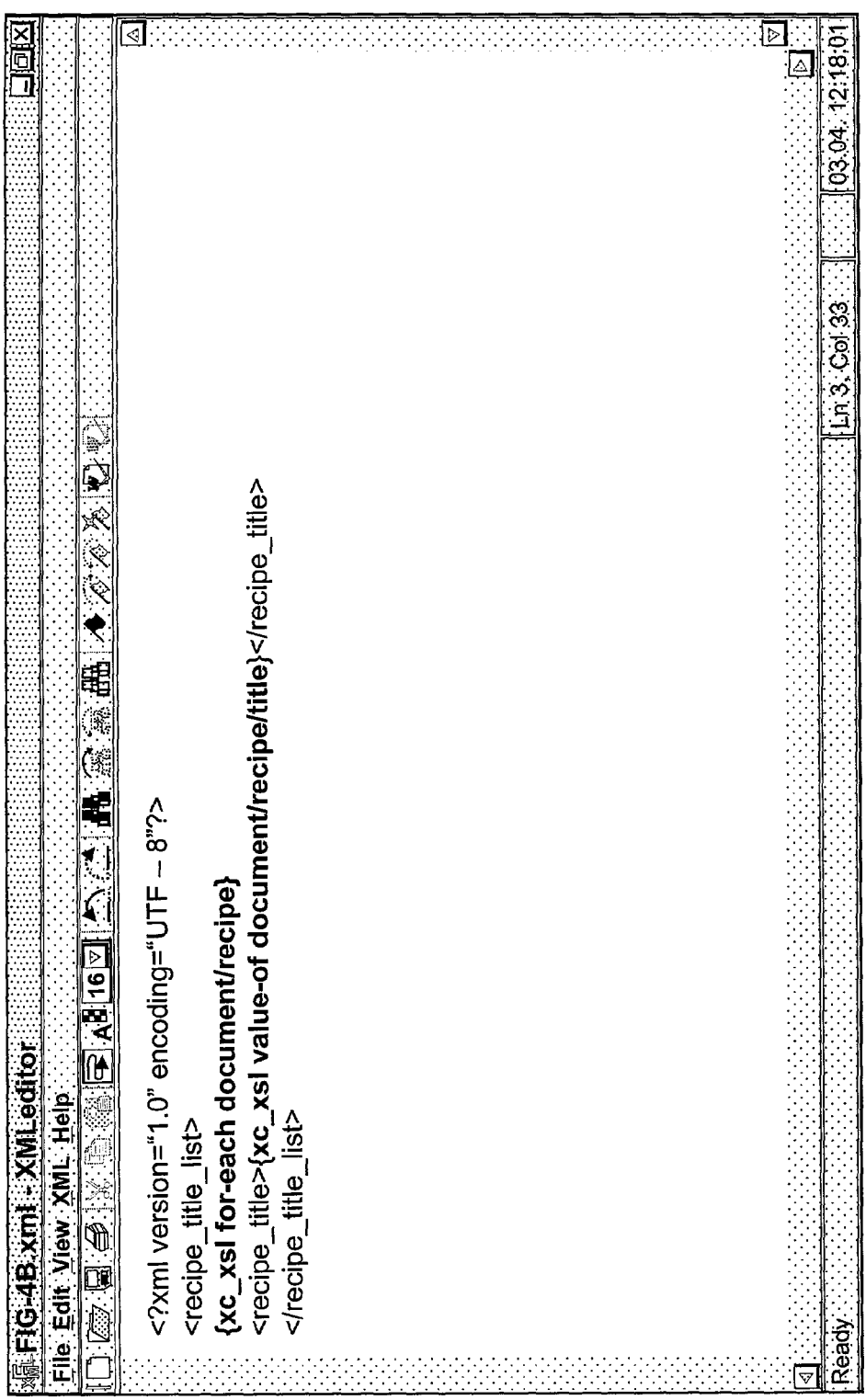
FIG. 4B shows a screenshot of a target XML with inserted meta-tag information.

FIG. 4A shows an example of a target HTML file with inserted meta-tag information in FrontPage. For example, an original object "Green Chili Salsahas been replaced by a meta-tag "xc_xslt value-of document/recipe/title. In particular, this HTML file is a combination of static texts, such as "Title:", "From:", "Ingredient:" . . . , and the dynamic information (i.e. the respective objects) from the source XML file, wherein the dynamic objects have been represented in the meta-tags, which in this example, are contained by a declaration, {xc_xslt . . . }. According to one embodiment, within a declaration, there are at least two items, one is for user specified operation, such as "value-of", the other one is for path information, such as "document/recipe/title", so as to specify the associated XSL actions and/or the source object in the source XML file. Furthermore, the text decoration, such as font size, color, style, around the meta-tag declaration will also be propagated into the dynamic information during conversion. FIG. 4B shows another example of a target XML file with inserted meta-tag information in XMLeditor, which after conversion produces the XSL file 318 for the recipe title list. To further facilitate the detailed description of the present invention, an example based on HTML is provided herein and should not be interpreted as limitations to the present invention. These skilled in the art shall understand that the descriptions as well as examples herein can be readily applied to other markup languages. For a given target file in HTML to be converted to XML, one may open the target file in HTML by a browser such as Microsoft Internet Explorer or text editor. An HTML file can be shown that it includes not only the content of the HTML file but also the fixed set of tags as defined in HTML to describe the look and feel of the HTML file when viewed in a browser (i.e. Internet Explorer).

Figure 5A:
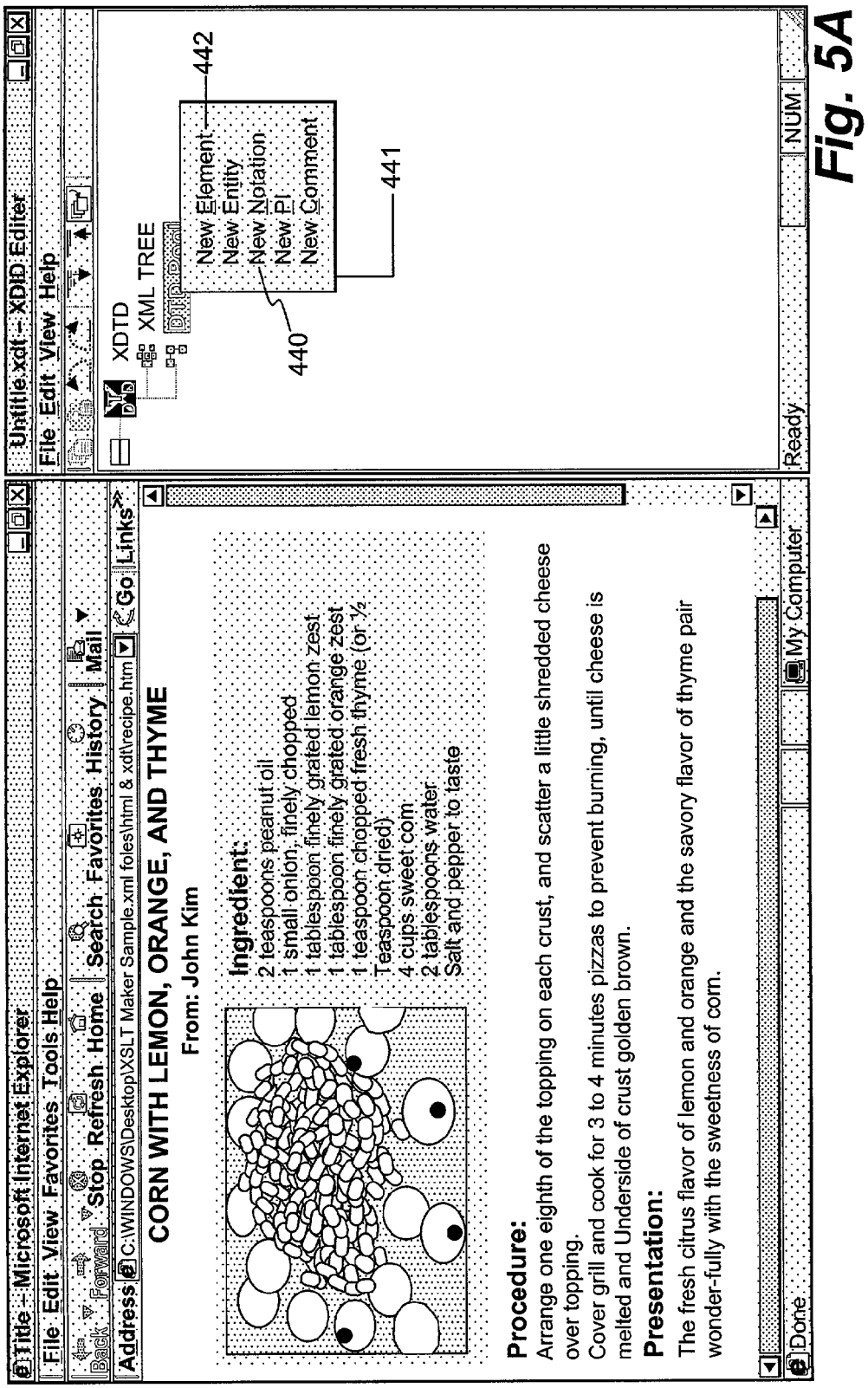
FIG. 5A shows an output representation of a target file along with an XML/DTD/Schema Editor (XDTD), which exports the meta-tag information through a drag-and-drop mechanism.

Once the HTML file is opened by a browser, the user can now open an XML utility, such as XDTD Editor from XML-Cities, Inc. having a business address at 1617A S. Main Street, Milpitas, Calif. 95035, and create the DTD elements 441 as shown in FIG. 5A. In DTD Pool 440, the user can create new element, new entity, new notation, new PI, and new comment, some of which can be directly associated with objects being displayed in the browser. FIG. 5B shows an example of creating a DTD of an XML file for the HTML file using the XDTD Editor and includes of an expanded view 451 of the created DTD, an example 452 of creating XML elements based on the created DTD and an expanded view of an XML Tree 453 with data nodes for elements, and attribute nodes for elements.

Once the XML tree is created, the user can copy a portion of the HTML data content, such as an object 461 of FIG. 5A, and insert it to the XDTD utility as data of the title element in the XML Tree through clipboard, drag-and-drop mechanisms, or OLE data transfer mechanisms. Other portions of the HTML data can be inserted in the XML tree in the similar manner.

After necessary respective contents or objects in an HTML file inserted into the XML Tree in XDTD Editor, the user can create an XML file as FIG. 5C. Given the XML file and/or corresponding DTD file, an XSL file may be created to reflect the look and feel expressed in the HTML file for the XML file as a source file, according to one aspect of the present invention. Unlike the case of HTML, element names in XML have no intrinsic presentation semantics. Absent a stylesheet, a processor (i.e. Microsoft Internet Explorer) could not possibly know how to render the contents of an XML document other than as an undifferentiated string of characters. Further details of generating XML sources from an output presentation and the use of DTD and XML trees are provided in U.S. patent application Ser. No. 09/754,969.

Figure 5D:
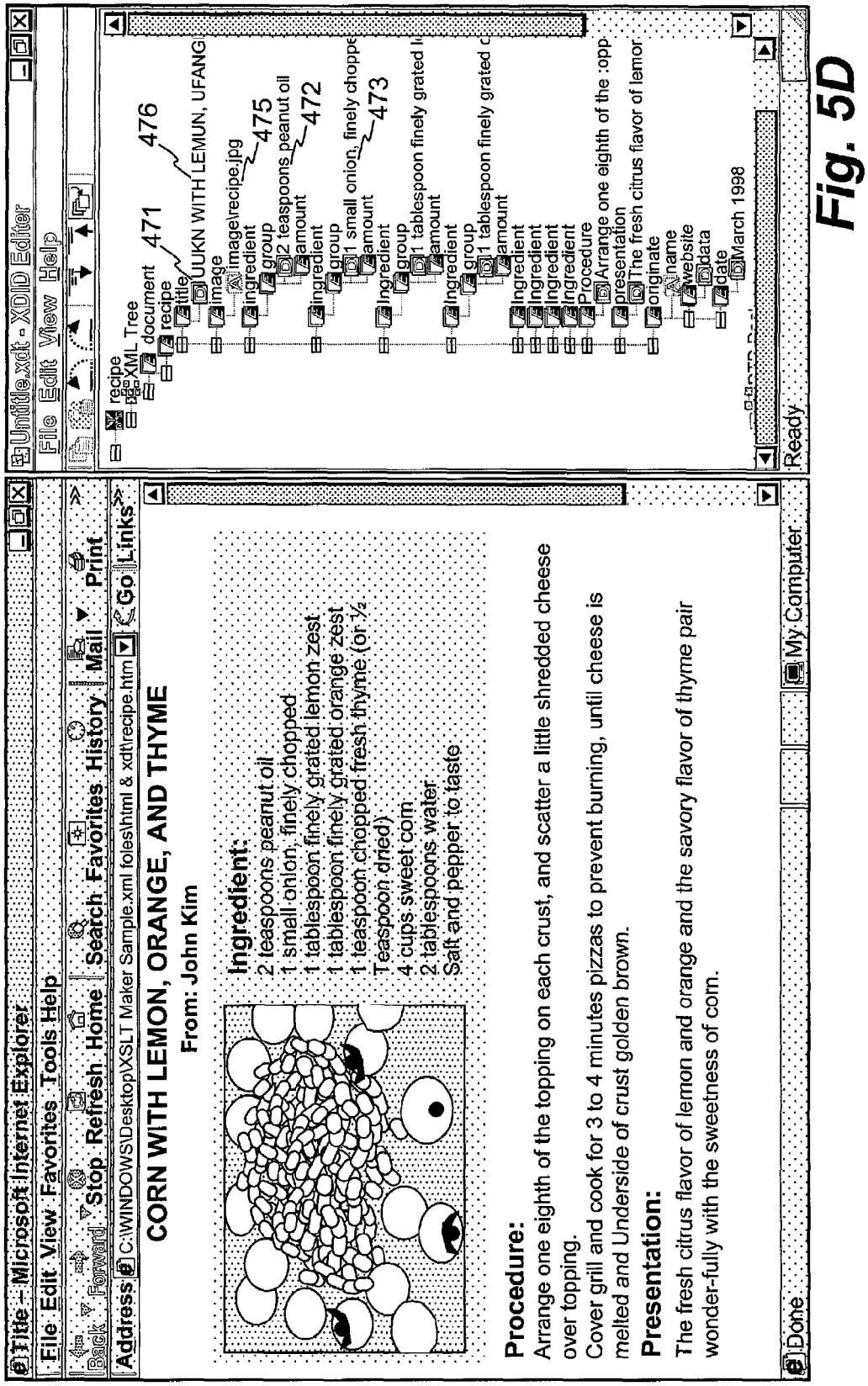
FIG. 5D shows data nodes (for corresponding meta-tags) in a tree structure for an XML file.

In certain aspect, XSL provides a comprehensive model and a vocabulary for writing such stylesheets using XML syntax. To create an XSL file, an automated XSL generating module is also contemplated in the present invention. According to one embodiment, meta-tags are used to associate respective elements or source objects in a source file (e.g., an XML file) with certain dynamic objects in a target file (e.g., an HTML file. Meta-tag or meta-tag information herein means any information from a source file (e.g. an XML document) that contains information about its association with a particular element in the source file, and the relation of its element in regards to other elements of the source file. For example, a meta-tag for a data node 476 as shown in FIG. 5D is {xc_xslt: document/recipe/title} where document/recipe/title shows the location of the data node and the relation to its parent node, i.e. title node with other elements of the XML document. Associated meta-tag information herein means any data from a file such as an HTML file or an XML file that contains or can be used to show the information about its meta-tag information of an XML document. For example, referenced by 471 of FIG. 5D is an associated meta-tag information because it can be used to search for the meta-tag information 476, such as document/recipe/title of {xc_xslt: document/recipe/title} in the XML file. Alternatively, the meta-tag information includes at least one user specified operation, such as <xsl:value-of\>.

In one embodiment of the invention, an XML file can be stored in computer memory and searched for meta-tags using an XML parser such as Document Object Module (DOM) Core of World Wide Web Consortium (W3), and use its API such as parentNode( ), nextSibling( ), childNodes( ), getNodeName( ), nodeName( ), and nodeValue( ).

With the XML file as a hierarchy of node objects, 476 of FIG. 5D can be used as an associated meta-tag information to obtain its meta-tag information by positioning the DOM parser pointer at the root element of the DOM Tree, using nodeName( ) to identify and store the name of the root element in a separate memory as {xc_xslt: document}, using NodeValue( ) to compare its node value with the meta-tag information 476. If they are not equal, use firstChild( ) to travel to its first child element, i.e. recipe element, use nodeName( ) to identify and store the node name in the same memory location where {xc_xslt: document} is stored by concatenating the content of the memory location with the new node name recipe as {xc_xslt: document/recipe}, and compare its nodeValue( ) with the meta-tag information 476. Using the above method recursively, one can obtain the meta-tag information 476, such as {xc_xslt:document/recipe/title} while using the associated meta-tag information 471 to stop the recursive loop when the nodeValue( ) equals to 471 of FIG. 5D.

Similarly, the user can obtain the meta-tag information for 475, 472, and 473 shown in FIG. 5D using the reverse of the recursive method. Hence, a user can find all the data nodes that contain associated meta-tag information, and subsequently build the meta-tag information by using parentNode( ) API of the DOM parser while reversely concatenating the meta-tag information such that {xc_xslt:title} to {xc_xslt:recipe/title} and {xc_xslt:recipe/title} to {xc_xslt:document/recipe/title}. In another embodiment of the invention, the user can also obtain the meta-tag information 476, 472, and 473 by using the same recursive method with an added condition such that the DOM Parser pointer will skip an element node using nextSibling ( ) from concatenating its name for its meta-tag information building if its nodeValue( ) is equal to an associated meta-tag information. Therefore, 475, 472, 473 in FIG. 5D are associated meta-tag information since their meta-tag information is built through association.

A user may further design the look-and-feel of the target presentations in a WYSIWYG authoring tool with inserted meta-tag information and/or associated meta-tag information. The target files with meta-tag information and/or associated meta-tag information will be loaded into an XSL converter, which automatically generates the resulting XSL files that match the look-and-feel of the target presentations in the WYSIWYG authoring tools. In one embodiment, if the targeted file contains the associated meta-tag information, the associated meta-tag information can be used to find the meta-tag information of an XML document that contains corresponding associated meta-tag information of targeted file, and replace the associated meta-tag information of the targeted file with the meta-tag information of the XML document during XSL file creation process.

According to one embodiment of the invention, a simple automatic XSL conversion can be made in the following way. An HTML file with meta-tag information and associated meta-tag information will be first checked and edited for its presentation formats according to the XML standard while preserving its look-and-feel of the HTML file when viewed by a web-browser. The changes that may be made in HTML files are such that all tags have distinct start and end components, empty elements are formatted correctly, all attribute values are quoted, and all tags are nested correctly. Once necessary changes are made for the HTML file to confirm the formats, XML standard is complied with, the HTML file can then be loaded into a computer memory via an XML Parser such as the one defined by World Wide Web consortium (W3) as DOM Core.

Once the HTML file is loaded into a user's computer memory by the DOM Parser as a hierarchy of Node objects, the APIs of the DOM Parser can be used to first isolate the HTML document's data node values and attribute node values. If the HTML file contains associated meta-tag associations, an XML file with/without associated DTD file that contains matching associated meta-tag information can be used to determine its meta-tag information. Once the meta-tag information is determined from an XML file, the associated meta-tag information will be replaced with the found meta-tag information.

All the meta-tag information of the HTML document loaded in the computer memory will be further manipulated such that if a meta-tag information is {xc_xslt:document/recipe/title}, it will be replaced as <xsl:value-of select="document/recipe/title">. If the meta-tag information is a value of an attribute node in the HTML document, the meta-tag information can be replaced as <xsl:value-of select="document/recipe/image/@img">. Meta-tag information and the structure of the HTML document in the XML Parser can be further changed so that it can support any of the XSL Elements of user's choice.

The declaration of XSL will be added at the beginning of the parsed HTML document using the XML parser API (DOM Core) as <?xml version='1.0' encoding='ISO-8859-1' standalone='yes'?><xsl:stylesheet version="1.0" xmlns:xsl="http://www.w3.org/1999/XSL/Transform"> <xsl:template match="/"> may also be added after the XSL declaration, and </xsl:template> </xsl:stylesheet> will be added at the end of parsed HTML document using the API of an XML Parser to transform the parsed HTML document as a valid XSLT document and output the XSLT document as a valid XSL file.

In another embodiment of the invention for simple XSL/XSLT file creation, a user can start by importing an XML file by using Import utility of XDTD Editor of XMLCitites, and dynamically create a new HTML file by inserting the meta-tag information or the associated meta-tag information of the XML file through clipboard, drag-and-drop mechanisms, or OLE data transfer mechanisms to the WYSIWYG authoring tools.

FIG. 6A shows an example of a target HTML file with inserted meta-tag information in FrontPage. In particular, this HTML file is a combination of the static texts, such as "Title:", "From:", "Ingredient:" . . . , and the dynamic information or objects from the source XML file. And the dynamic information is represented in the meta-tags, which in this example are contained by a declaration, {xc_xslt . . . }, and within the declaration there are certain values, such as "value-of document/recipe/title", to specify the associated XSL actions and/or the source XML tags. In another example, a meta-tag can be other text string, which specifies the associated XSL actions and/or the source XML tags. Furthermore, the text decoration, such as font size, color, and style, around the meta-tag declaration will also be propagated into the dynamic information during conversion.

FIG. 6B shows an example of a target HTML file with inserted meta-tag and associated meta-tag information in FrontPage. In particular, this HTML file is a combination of the static texts, such as "Title:", "From:", "Ingredient:" . . . , and the dynamic information from the source XML file. And in this example the dynamic information is represented in the meta-tag, {xc_xsl for-each}, and the associated meta-tags, which are indirectly through a meta-tag association file as given in FIG. 6C to specify the associated XSL actions and/or the source XML tags. In another example, the associated meta-tag can be other text string as meta-tag identifier, which uniquely specifies the associated XSL actions and/or the source XML tags. Although using associated meta-tags requires an extra mapping, the associated meta-tags can preserve the look-and-feel of the final presentation, which is especially important in a WYSIWYG authoring environment such as FrontPage.

There are several ways to insert the meta-tag information in the target authoring tools. In one implementation, the meta-tags are inserted by directly typing the meta-tag declarations in the authoring tools. In another implementation, the meta-tags can be inserted through clipboard, drag-and-drop mechanisms, or OLE data transfer mechanisms, from an XML/DTD/schema editor to the authoring tools.

Figure 7A:
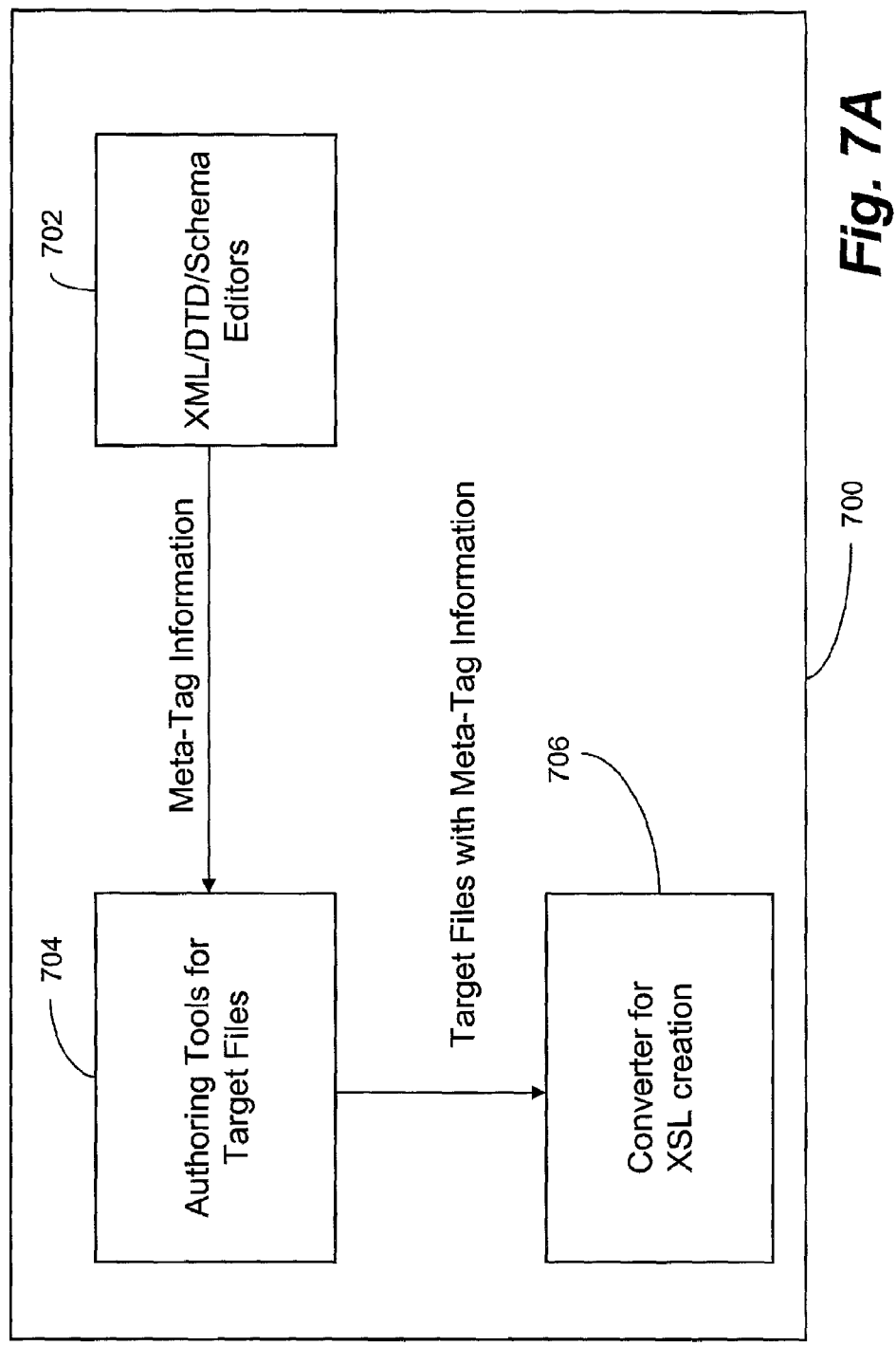
FIG. 7A illustrates a block diagram of a data processing apparatus in which the target files with meta-tag information are created by authoring tools and converted into XSL files through a converter.

FIG. 7A illustrates a block diagram of a data processing apparatus 700, in which the target files with meta-tag information are created by authoring tools 704 and converted into XSL files through a converter 706. And the meta-tag information is inserted in the authoring tools by directly typing the meta-tag declarations or through clipboard, drag-and-drop mechanisms, or OLE data transfer mechanisms, from an XML/DTD/schema editor 702.

Figure 7B:
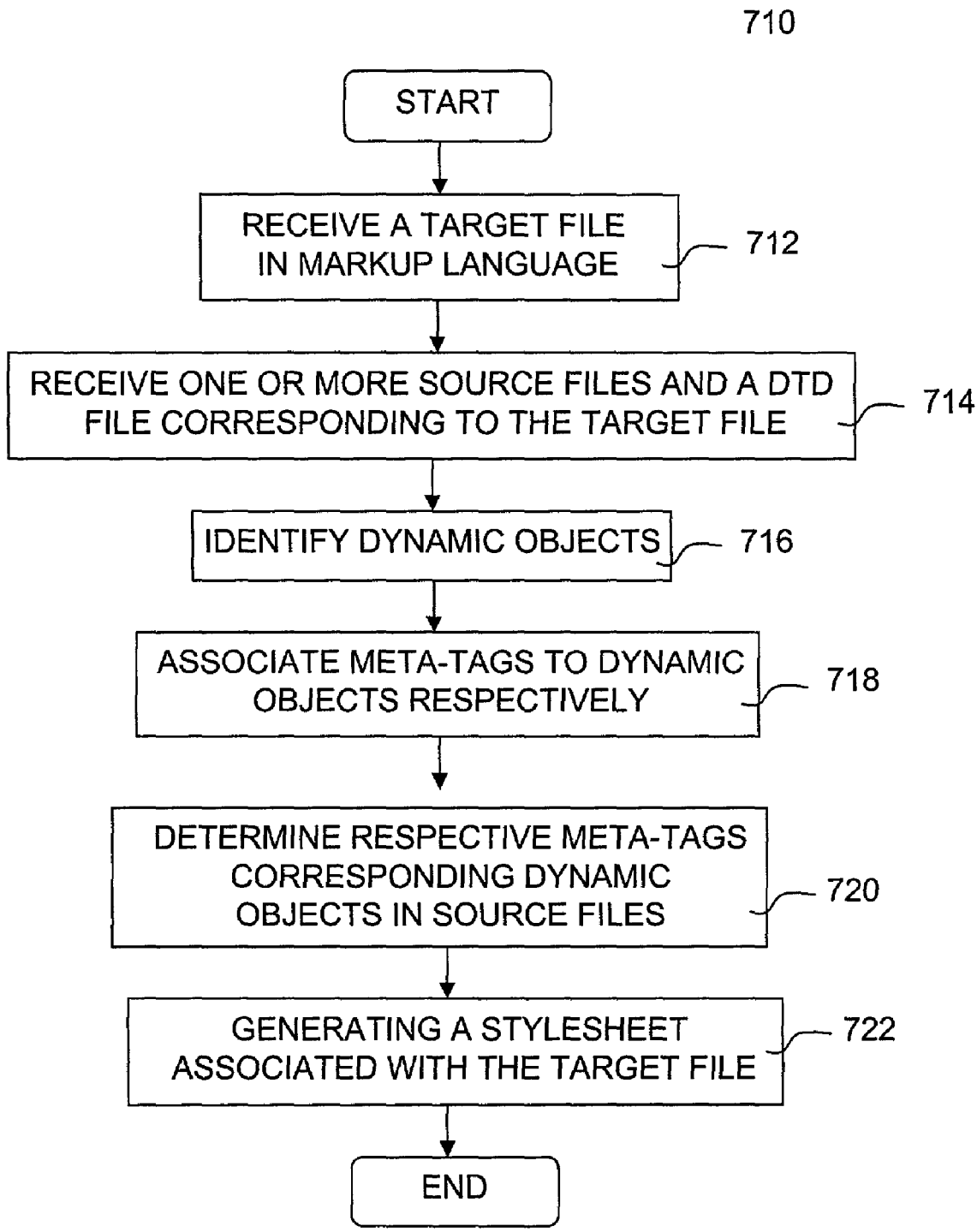
FIG. 7B shows a flowchart of generating an extensible stylesheet according to one embodiment of the present invention.

FIG. 7B shows a flowchart 710 of generating an extensible stylesheet according to one embodiment of the present invention. At 712, a target file is received. As described above, the target file is a presentation created for display on a device (e.g., a desktop computer or a portable device). For example, a target file in HTML file created using FrontPage for display in Internet Explorer running in a desktop computer. The act of receiving or otherwise accessing a target file is sometimes said to be performed by a "target document accessing subsystem." The target document structuring accessing subsystem and other subsystems referred to herein are sometimes regarded as including one or more processors, such as microprocessors or CPUs. With the target file displayed, the corresponding one or more source files (e.g. XML files) together with the corresponding DTD file are loaded at 714 to facilitate the creation of the extensible stylesheet. The loading or other accessing of the corresponding DTD file is sometimes said to be performed by a "document type definition structure accessing subsystem." Next, dynamic objects in the displayed target file are identified at 716 and each of the dynamic objects shall correspond to a source element or object in the source files. The act of identifying dynamic objects in the target file is sometimes said to be performed by an "identification subsystem." Depending on implementation, the dynamic objects may be manually identified by a user or indicated at creation of the target file.

At 718, each of meta-tags is determined with respect to one of the dynamic objects. According to one embodiment, each of the dynamic objects is replaced by a meta-tag or path information that is to be included in a meta-tag. This replacement is sometimes said to be performed by a "static data item replacement subsystem." According to another embodiment, each of the dynamic objects is dragged onto a corresponding node in an XML tree provided by the XML files and/or the DTD file (see FIG. 5D). By dragging a dynamic object onto a node, an association between the dynamic object and the corresponding element in the source file can be established.

At 720, tag information for each of the meta-tags is determined by, for example, traversing the XML tree, it is assumed by now that each of the nodes in the XML tree has respective related information for each of the meta-tags. As a result at 722, a stylesheet is generated and corresponding to the target file. In particular, the stylesheet is expressed in a file in another markup language. The file includes respective declarations, each for one of the mega-tags. The stylesheet is sometimes said to be generated by an "extensible stylesheet generation subsystem."

In certain target files, there are dynamic objects that refer to a same element in a source file. To avoid possible ambiguity in identifying the corresponding meta-tags, a mechanism for identifying the meta-tags differently is provided.

FIG. 8A shows a file in XML with <root/> as the root element. The XML file contains two elements where using XSLT notation, can be identified as <xsl:value of select="root/book[1]/name/text( )"/>
<xsl:value of select="root/book[2]/name/text( )/>.

The data and attributes of the XML file can then be placed in an HTML file so that the HTML file can later be used to generate an XSLT where the data and attributes of the XML file can be used to identify the location of where to put the tag <xsl:value of select=" "/>. For example, 812 is placed as data of <title/> elements in FIG. 8A. According to one embodiment, a user can use a string match between the XML document of FIG. 8A and the HTML document of FIG. 8B so that "C++ Programming" of the HTML document can then be replaced with <xsl:value of select="root/book[1]/name/text( )"/>.

However, the content of the two uniquely identifiable elements can be placed in as data of one HTML element tag i.e. <p/> as shown in FIG. 8B. "C++ Programming, Visual C++ 5" 521 is shown as data of <p/> elements. Using DOM, "C++ Programming, Visual C++ 5" 521 will be represented as one text data of <p/> element. Through the exact string match, "C++ Programming, Visual C++ 5" will not find exact match with any of the data or attribute of the XML in FIG. 8A as the XML file contains, "C++ Programming", "Michael Kim", Visual C++, and "Ivor Horton", but not "C++ Programming, Visual C++" while the desired matching is <p><xsl:value of select="root/book[1]/name/text( )"/>, <xsl:value of select="root/book[2]/name/text( )"/>.

One of the features in the present invention is storing all the XML data and Attributes in a separate memory where each XML data or attributes also contains information or links to information about its meta-tag information. The meta-tag information contains the information about its parent element and the parent element's relationship with the root elements so that the meta-tag information will be sufficient to address its correct attribute value for select in <xsl:value of select= " ">. The data and the attributes of the XML document and their corresponding meta-tag information will be stored in an order such that the data or attributes can be accessed in an increasing or decreasing order.

According to one embodiment, an HTML document that contains the data or attributes of an XML document is received. A method is then initiated to identify the data of the HTML document and compare the data with the set of the XML data or attribute stored in a separate memory. The method then compares and identifies the data with the data or attributes stored in the separate memory in the order of the length of the string to determine if the largest matching XML data or attribute is included in the HTML data.

Figure 8C:
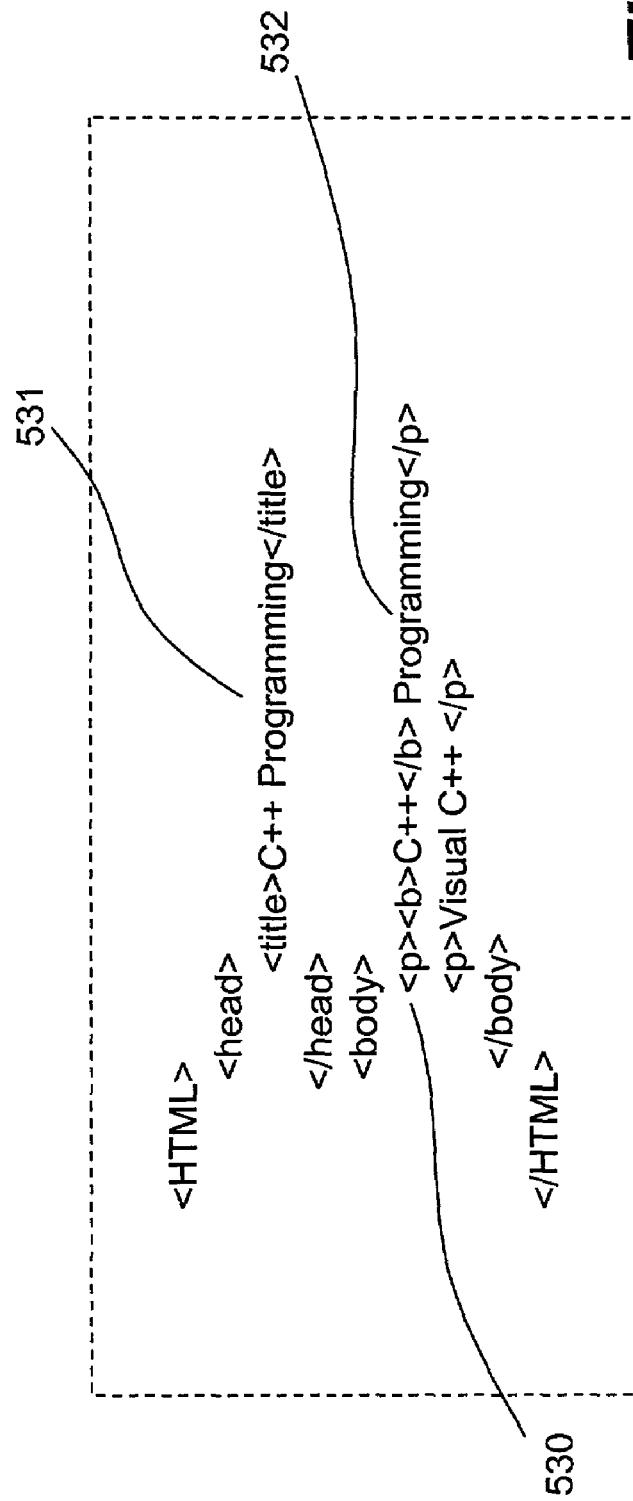
FIG. 8C shows an example of HTML document that contains an element with broken XML text data.

FIG. 8C shows an example of HTML document that contains an element with broken XML text data. FIG. 8C shows an element 530 <p/> that contains the text data "C++ Programming" 500 of FIG. 8A. However the text data is further broken into two separate text data such that "C++" is now the child of <b/> element that is the child of <p/> element 530 and "Programming" is the child of <p/> element. It should be noted that both 531 and 532 belong to <p/> element.

For broken text data as associated meta-tag information in an HTML element, according to one embodiment of the invention, it takes advantage of the fact that both 531 and 532 belong to <p> element that is 530. A software implementation of the invention obtains the first text data 531 of the child element of the 530 and put it into a separate memory. Then the software implementation of the preferred embodiment of the invention would obtain the next text data 532 as the next consecutive child element of 530, and store the 532 next to 530 in the separate memory. After no more next child element or child of the child element for the given element is found, then the software implementation of the preferred invention searches for the XML text data or attribute for matching, for example, the concatenated 531 and 532. When the match is found, then the entire content of the 530 would be replaced with the meta-tag information of 500 that would later be replaced as <xsl:value of select="root/book[1]/name/text( )"/>.

With all the meta-tag information of the HTML document loaded in the computer memory, all the meta-tag information will be further manipulated such that if meta-tag information is {xc_xslt:document/recipe/title}, it will be replaced as <xsl:value-of select="document/recipe/title">. If the meta-tag information is a value of an attribute node in the HTML document as in 475, the meta-tag information can be replaced as <xsl:value-of select="document/recipe/image/@img">. Meta-tag information and the structure of the HTML document in the XML Parser can be further changed so that it can support any of the XSLT Elements of user's choice.

Figure 9:
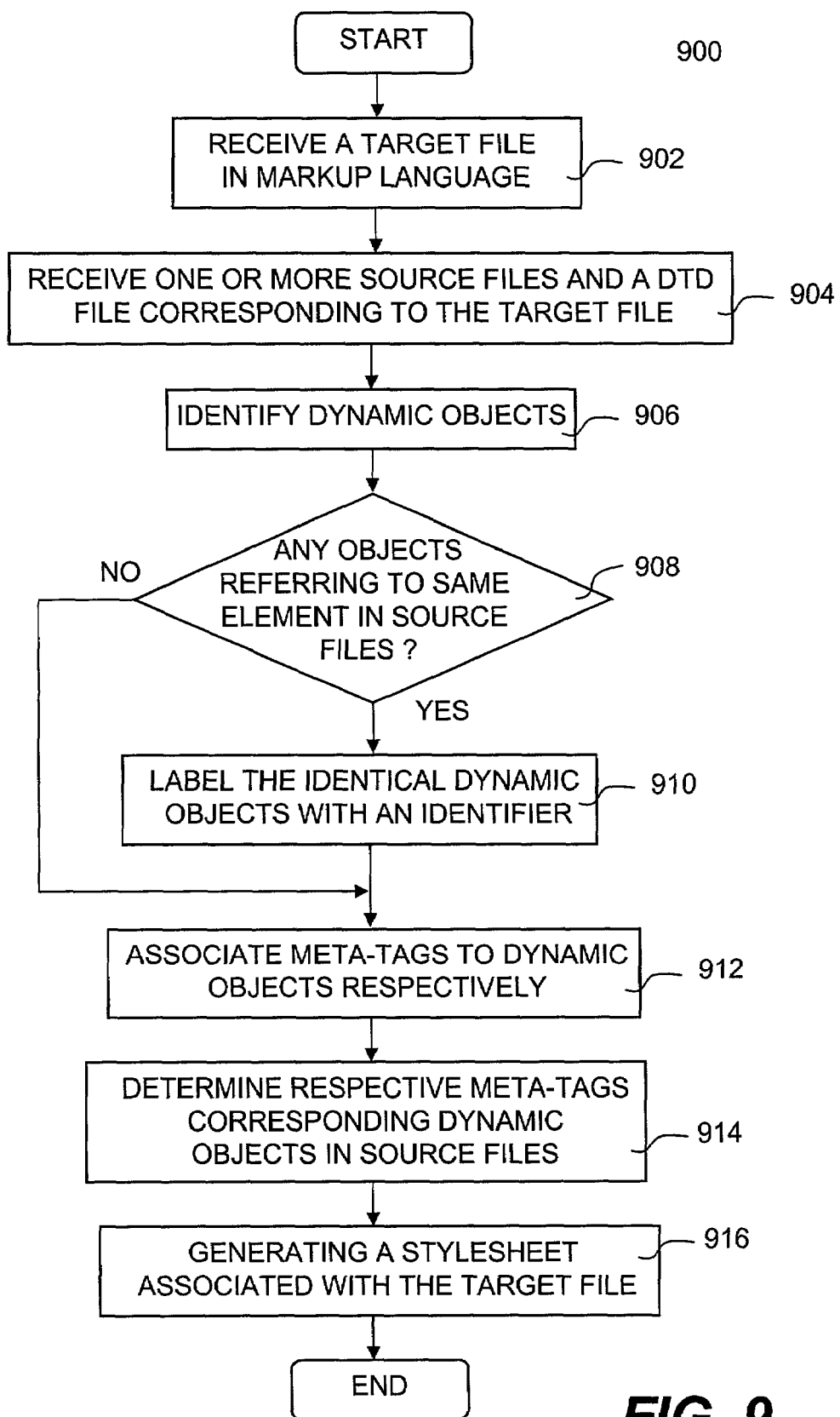
FIG. 9 shows a flowchart of processing dynamic objects that refer to a same element in a source file and may be understood in conjunction with FIGS. 8A-8C.

FIG. 9 shows a flowchart of processing dynamic objects that refer to a same element in a source file and may be understood in conjunction with FIGS. 8A-8C. At 902, a target file is received. As described above, the target file is a presentation created for display on a device (e.g., a desktop computer or a portable device). For example, a target file in HTML file created using FrontPage for display in Internet Explorer running in a desktop computer. With the target file displayed, the corresponding one or more source files (e.g. XML files) together with the corresponding DTD file are loaded at 904 to facilitate the creation of the extensible stylesheet. Next, dynamic objects in the displayed target file are identified at 906 and each of the dynamic objects shall correspond to a source element or object in the source files. Depending on implementation, the dynamic objects may be manually identified by a user or indicated at creation of the target file.

At 908, it is determined if any of the identified dynamic objects refer to the same element in the source file. If no dynamic objects refer to the same element in the source file, the process 900 goes to 912. If any two of the dynamic objects refer to the same element in the source file, the process 900 goes to 910, wherein these dynamic objects are to be labeled differently. According to one embodiment, these dynamic objects are labeled numerically according to their occurrences, identifiers used to label them can facilitate the creation of the stylesheet. After the these dynamic objects are labeled, the process 900 goes to 912.

In any case, at 912, each of meta-tags is determined with respect to one of the dynamic objects. According to one embodiment, each of the dynamic objects is replaced by a meta-tag or path information that is to be included in a meta-tag. According to another embodiment, each of the dynamic objects is dragged onto a corresponding node in an XML tree provided by the XML files and/or the DTD file (see FIG. 5D). By dragging a dynamic object onto a node, an association between the dynamic object and the corresponding element in the source file can be established.

At 914, tag information for each of the meta-tags is determined by, for example, traversing the XML tree, it is assumed by now that each of the nodes in the XML tree has respective related information for each of the meta-tags. As a result, at 916, a stylesheet is generated and corresponding to the target file. In particular, the stylesheet is expressed in a file in another markup language. The file includes respective declarations, each for one of the mega-tags.

The present invention pertains to the use of meta-tag information to design extensible stylesheets (XSL) for transferring a source XML file into a target file. There are numerous benefits, features, and advantages in the present invention. One of them is the use of meta-tags to relate to the relationship or association information between dynamic objects in a target file to corresponding elements in a source file. Other benefits, features, and advantages can be readily appreciated by those skilled in the art.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method in a computing system for generating an extensible stylesheet, comprising:

accessing a distinguished target document in a target markup language, the distinguished target document containing static data items and specifying display characteristics for at least a portion of the contained static data items;

accessing a document type definition structure that establishes a hierarchical relationship among a set of multiple dynamic documents elements by specifying, for each of the set of dynamic document elements, a path identifying a position of the dynamic document element in the hierarchical relationship, wherein a distinguished source document that (1) is in a source markup language that is compliant with the document type definition structure and (2) specifies instance data for at least a portion of the set of dynamic document elements is to be transformed into the distinguished target document by applying the generated extensible stylesheet to the distinguished source document;

for each of a plurality of selected static data items among the static data items contained by the distinguished target document, identifying a corresponding dynamic document element in the accessed document type definition structure's set of dynamic document elements such that the selected static data item is an instance of the corresponding dynamic document element;

for each of the plurality of selected static data items, replacing the selected static data item in the distinguished target document with a reference to the identified corresponding dynamic document element, the reference containing the path specified for the identified corresponding dynamic document element by the document type definition structure;

after the replacing, generating the extensible stylesheet from the distinguished target document such that the extensible stylesheet contains the references to the corresponding dynamic document elements, and such that the extensible stylesheet specifies for each reference to an identified dynamic document element any display characteristics specified by the distinguished target document for the static data item corresponding to the dynamic document element;

simultaneously displaying the distinguished target document and the document type definition structure, and wherein, for each selected static data item, a corresponding dynamic document element is identified by receiving user input specifying a correspondence between the selected static data item and the corresponding dynamic document element, wherein, for each selected static data item, the received user input is user input dragging one of the selected static data item and the corresponding dynamic document element to the other of the selected static data item and the corresponding dynamic document element.

2. The method of claim 1 wherein the references with which the selected static data items are replaced are meta-tags each containing a path to one of the corresponding dynamic document elements.

3. The method of claim 1 wherein the generated extensible stylesheet specifies for at least one reference to an identified dynamic document element a display characteristic specifying a font color in which instance data for the referenced dynamic document is to be displayed.

4. The method of claim 1 wherein the generated extensible stylesheet specifies for at least one reference to an identified dynamic document element a display characteristic specifying a relative location at which instance data for the referenced dynamic document is to be displayed.

5. The method of claim 1, further comprising storing the generated extensible stylesheet.

6. The method of claim 1, further comprising:

accessing a source document in the source markup language other than the distinguished source document; and transforming the accessed source document into a target document in the target markup language by applying the generated extensible stylesheet to the accessed source document.

7. The method of claim 1, further comprising constructing the accessed document type definition structure based upon user input.

8. The method of claim 1, further comprising accessing the distinguished source document, and wherein, for each selected static data item, a corresponding dynamic document element is identified by automatically matching the selected static data item with contents of the distinguished source document associated by the distinguished source document with the corresponding dynamic document element.

9. The method of claim 8, further comprising constructing the distinguished source document based upon user input.

10. The method of claim 1 wherein the target markup language is different from the source markup language.

11. The method of claim 1 wherein the target markup language is the same as the source markup language.

12. A computer-readable storage medium storing at least computer program code, the at least computer program code executed by a computing system to perform a method for generating an extensible stylesheet, the method comprising:

accessing a distinguished target document in a target markup language, the distinguished target document containing static data items and specifying display characteristics for at least a portion of the contained static data items;

accessing a document type definition structure that establishes a hierarchical relationship among a set of multiple dynamic documents elements by specifying, for each of the set of dynamic document elements, a path identifying a position of the dynamic document element in the hierarchical relationship, wherein a distinguished source document that (1) is in a source markup language that is compliant with the document type definition structure and (2) specifies instance data for at least a portion of the set of dynamic document elements is to be transformed into the distinguished target document by applying the generated extensible stylesheet to the distinguished source document;

for each of a plurality of selected static data items among the static data items contained by the distinguished target document, identifying a corresponding dynamic document element in the accessed document type definition structure's set of dynamic document elements such that the selected static data item is an instance of the corresponding dynamic document element;

for each of the plurality of selected static data items, replacing the selected static data item in the distinguished target document with a reference to the identified corresponding dynamic document element, the reference containing the path specified for the identified corresponding dynamic document element by the document type definition structure;

after the replacing, generating the extensible stylesheet from the distinguished target document such that the extensible stylesheet contains the references to the corresponding dynamic document elements, and such that the extensible stylesheet specifies for each reference to an identified dynamic document element any display characteristics specified by the distinguished target document for the static data item corresponding to the dynamic document element;

simultaneously displaying the distinguished target document and the document type definition structure, and wherein, for each selected static data item, a corresponding dynamic document element is identified by receiving user input specifying a correspondence between the selected static data item and the corresponding dynamic document element, wherein, for each selected static data item, the received user input is user input dragging one of the selected static data item and the corresponding dynamic document element to the other of the selected static data item and the corresponding dynamic document element.

13. The computer-readable storage medium of claim 12 wherein the references with which the selected static data items are replaced are meta-tags each containing a path to one of the corresponding dynamic document elements.

14. The computer-readable storage medium of claim 12, further comprising storing the generated extensible stylesheet.

15. The computer-readable storage medium of claim 12, further comprising:

accessing a source document in the source markup language other than the distinguished source document; and transforming the accessed source document into a target document in the target markup language by applying the generated extensible stylesheet to the accessed source document.

16. The computer-readable storage medium of claim 12, further comprising constructing the accessed document type definition structure based upon user input.

17. The computer-readable storage medium of claim 12, further comprising accessing the distinguished source document, and wherein, for each selected static data item, a corresponding dynamic document element is identified by automatically matching the selected static data item with contents of the distinguished source document associated by the distinguished source document with the corresponding dynamic document element.

18. A system including at least one processor for generating an extensible stylesheet, comprising:

means for accessing a distinguished target document in a target markup language, the distinguished target document containing static data items and specifying display characteristics for at least a portion of the contained static data items;

means for accessing a document type definition structure that establishes a hierarchical relationship among a set of multiple dynamic documents elements by specifying, for each of the set of dynamic document elements, a path identifying a position of the dynamic document element in the hierarchical relationship, wherein a distinguished source document that (1) is in a source markup language that is compliant with the document type definition structure and (2) specifies instance data for at least a portion of the set of dynamic document elements is to be transformed into the distinguished target document by applying the generated extensible stylesheet to the distinguished source document;

means for, for each of a plurality of selected static data items among the static data items contained by the distinguished target document, identifying a corresponding dynamic document element in the accessed document type definition structure's set of dynamic document elements such that the selected static data item is an instance of the corresponding dynamic document element;

means for, for each of the plurality of selected static data items, replacing the selected static data item in the distinguished target document with a reference to the identified corresponding dynamic document element, the reference containing the path specified for the identified corresponding dynamic document element by the document type definition structure;

means including a computing device for, after the replacing, generating the extensible stylesheet from the distinguished target document such that the extensible stylesheet contains the references to the corresponding dynamic document elements, and such that the extensible stylesheet specifies for each reference to an identified dynamic document element any display characteristics specified by the distinguished target document for the static data item corresponding to the dynamic document element;

means for simultaneously displaying the distinguished target document and the document type definition structure, and wherein, for each selected static data item, a corresponding dynamic document element is identified by receiving user input specifying a correspondence between the selected static data item and the corresponding dynamic document element, wherein, for each selected static data item, the received user input is user input dragging one of the selected static data item and the corresponding dynamic document element to the other of the selected static data item and the corresponding dynamic document element.

19. The system of claim 18 wherein the references with which the selected static data items are replaced are meta-tags each containing a path to one of the corresponding dynamic document elements.

20. The system of claim 18, further comprising means for storing the generated extensible stylesheet.

21. The system of claim 18, further comprising:
   means for accessing a source document in the source markup language other than the distinguished source document; and
   means for transforming the accessed source document into a target document in the target markup language by applying the generated extensible stylesheet to the accessed source document.

22. The system of claim 18, further comprising means for constructing the accessed document type definition structure based upon user input.

23. The system of claim 18, further comprising means for accessing the distinguished source document, and wherein, for each selected static data item, a corresponding dynamic document element is identified by automatically matching the selected static data item with contents of the distinguished source document associated by the distinguished source document with the corresponding dynamic document element.

24. A computing system including at least one processor for generating an extensible stylesheet, comprising:
   a target document accessing subsystem that accesses a distinguished target document in a target markup language, the distinguished target document containing static data items and specifying display characteristics for at least a portion of the contained static data items;
   a document type definition structure accessing subsystem that accesses a document type definition structure that establishes a hierarchical relationship among a set of multiple dynamic documents elements by specifying, for each of the set of dynamic document elements, a path identifying a position of the dynamic document element in the hierarchical relationship, wherein a distinguished source document that (1) is in a source markup language that is compliant with the document type definition structure and (2) specifies instance data for at least a portion of the set of dynamic document elements is to be transformed into the distinguished target document by applying the generated extensible stylesheet to the distinguished source document;
   an identification subsystem that, for each of a plurality of selected static data items among the static data items contained by the distinguished target document, identifies a corresponding dynamic document element in the accessed document type definition structure's set of dynamic document elements such that the selected static data item is an instance of the corresponding dynamic document element;
   a static data item replacement subsystem including a computing device that, for each of the plurality of selected static data items, replaces the selected static data item in the distinguished target document with a reference to the identified corresponding dynamic document element, the reference containing the path specified for the identified corresponding dynamic document element by the document type definition structure;
   an extensible stylesheet generation subsystem that, after the replacing, generates the extensible stylesheet from the distinguished target document such that the extensible stylesheet contains the references to the corresponding dynamic document elements, and such that the extensible stylesheet specifies for each reference to an identified dynamic document element any display characteristics specified by the distinguished target document for the static data item corresponding to the dynamic document element;
   a display subsystem that simultaneously displays the distinguished target document and the document type definition structure, and wherein, for each selected static data item, a corresponding dynamic document element is identified by receiving user input specifying a correspondence between the selected static data item and the corresponding dynamic document element,
   wherein, for each selected static data item, the received user input is user input dragging one of the selected static data item and the corresponding dynamic document element to the other of the selected static data item and the corresponding dynamic document element.

25. The computing system of claim 24 wherein the references with which the selected static data items are replaced are meta-tags each containing a path to one of the corresponding dynamic document elements.

26. The computing system of claim 24, further comprising an extensible stylesheet storage subsystem that stores the generated extensible stylesheet.

27. The computing system of claim 24, further comprising:
   a source document accessing subsystem that accesses a source document in the source markup language other than the distinguished source document; and
   a source document transformation subsystem that transforms the accessed source document into a target document in the target markup language by applying the generated extensible stylesheet to the accessed source document.

28. The computing system of claim 24, further comprising a document type definition structure construction subsystem that constructs the accessed document type definition structure based upon user input.

29. The computing system of claim 24, further comprising a source document accessing subsystem that accesses the distinguished source document, and wherein, for each selected static data item, a corresponding dynamic document element is identified by automatically matching the selected static data item with contents of the distinguished source document associated by the distinguished source document with the corresponding dynamic document element.

* * * * *